(12) United States Patent
Fukutomi et al.

(10) Patent No.: US 11,557,436 B2
(45) Date of Patent: Jan. 17, 2023

(54) MULTILAYER CERAMIC CAPACITOR AND MOUNT STRUCTURE FOR MULTILAYER CERAMIC CAPACITOR

(71) Applicant: Murata Manufacturing Co., Ltd., Nagaokakyo (JP)

(72) Inventors: Yuta Fukutomi, Nagaokakyo (JP); Tomohiro Kageyama, Nagaokakyo (JP); Tatsuya Suzuki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 20 days.

(21) Appl. No.: 17/027,759

(22) Filed: Sep. 22, 2020

(65) Prior Publication Data

US 2021/0134529 A1    May 6, 2021

(30) Foreign Application Priority Data

Oct. 31, 2019    (JP) .............................. JP2019-198823

(51) Int. Cl.
| | |
|---|---|
| *H01G 4/30* | (2006.01) |
| *H01G 4/012* | (2006.01) |
| *H01G 2/06* | (2006.01) |
| *H01G 4/008* | (2006.01) |
| *H01G 4/12* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC .......... H01G 4/224; H01G 4/248; H01G 4/30; H01G 4/38; H01G 4/012; H01G 4/1227; H01G 4/1245; H01G 4/065; H01G 4/0085; H01G 4/40; H01G 4/12; H01G 4/1218; H01G 4/008; H05K 1/0231
See application file for complete search history.

(56) References Cited

U.S. PATENT DOCUMENTS 9,178,483 B1 * 11/2015 Park ......................... H01G 4/30
2006/0279903 A1 * 12/2006 Togashi ................. H01G 4/232
361/303

(Continued)

FOREIGN PATENT DOCUMENTS

JP    06-283370 A    10/1994
JP    08-37126 A    2/1996

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers and internal electrode layers, first and second external electrodes provided on respective opposing end surfaces, and third and fourth external electrodes provided on any side surface. The internal electrode layers include first and second internal electrode layers connected to the first and second external electrodes, respectively, and third and fourth internal electrode layers connected to the third and fourth external electrodes, respectively. The third internal electrode layer is provided at a distance from the first internal electrode layer, and the fourth internal electrode layer is provided at a distance from the second internal electrode layer.

18 Claims, 12 Drawing Sheets

(56) References Cited

U.S. PATENT DOCUMENTS

| | | | |
|---|---|---|---|
| 2014/0311785 A1* | 10/2014 | Park | H01G 4/30 |
| | | | 361/301.4 |
| 2015/0041202 A1* | 2/2015 | Ahn | H01F 27/40 |
| | | | 361/270 |
| 2016/0118187 A1* | 4/2016 | Ahn | H01G 2/16 |
| | | | 361/301.4 |
| 2017/0103853 A1* | 4/2017 | Zenzai | H01G 4/30 |
| 2018/0090273 A1* | 3/2018 | Hwang | H01G 4/2325 |
| 2018/0174758 A1* | 6/2018 | Lee | H01G 4/232 |
| 2018/0182552 A1* | 6/2018 | Sawada | H01G 4/30 |
| 2018/0286592 A1* | 10/2018 | Ko | H01G 4/30 |

FOREIGN PATENT DOCUMENTS

| | | | | |
|---|---|---|---|---|
| JP | 2008-160164 A | 7/2008 | | |
| JP | 2011-134782 A | 7/2011 | | |
| WO | 2007/116566 A1 | 10/2007 | | |
| WO | WO-2007116566 A1 * | 10/2007 | | H01G 4/012 |

\* cited by examiner

MULTILAYER CERAMIC CAPACITOR AND MOUNT STRUCTURE FOR MULTILAYER CERAMIC CAPACITOR

CROSS REFERENCE TO RELATED APPLICATIONS

This application claims the benefit of priority to Japanese Patent Application No. 2019-198823 filed on Oct. 31, 2019. The entire contents of this application are hereby incorporated herein by reference.

BACKGROUND OF THE INVENTION

1. Field of the Invention

The present disclosure relates to a multilayer ceramic capacitor and a mount structure for a multilayer ceramic capacitor, and particularly, to a multilayer ceramic capacitor having a high capacitance and a mount structure for a multilayer ceramic capacitor.

2. Description of the Related Art

With reduction in size and multi-functionality of an electronic product in recent years, an electronic component also tends to be reduced in size and sophisticated in function. Therefore, a product of a multilayer ceramic capacitor reduced in size and high in capacitance has also been demanded. Accordingly, a multilayer ceramic capacitor smaller in thickness of a dielectric layer and an internal electrode and larger in number of layers has been manufactured.

When a dielectric layer is reduced in thickness to improve capacitance density, a voltage per unit thickness becomes higher and thus intensity of electric field applied to the dielectric layer becomes higher. Since a breakdown voltage (which is also referred to as a BDV below) is thus lower, occurrence of breakdown of the dielectric layer even by application of a low voltage is more likely. In general, when a voltage is applied to a multilayer ceramic capacitor, electric field strength is higher at a tip end in a length direction of an internal electrode than in a central portion thereof because electric field from drawn electrodes located above and below in a direction of layering flows around. In particular, in such a quadrangular pattern that ends of the internal electrodes are formed in parallel or substantially in parallel in the direction of layering, electric field strength is higher between an end of the internal electrode on a side not exposed through a multilayer body (an end of the internal electrode not connected to an external electrode) and an external electrode, which leads to deterioration of breakdown voltage characteristics. A secured capacitance density and suppression of concentration of electric field are thus in a trade-off relationship.

A structure of a multilayer ceramic capacitor as disclosed, for example, in Japanese Patent Laid-Open No. 8-37126 may be adopted as a technique to solve the problem above. The structure in Japanese Patent Laid-Open No. 8-37126 is a serial structure (what is called a series structure). Therefore, by manufacturing an element to have a thickness of at most ½ the thickness in a normal structure and to include layers at least twice as many as in the normal structure, a BDV higher than in the normal structure can be secured while a capacitance density equivalent to that in the normal structure is secured. The series structure refers to such a structure that each of a plurality of capacitor components connected electrically in parallel or substantially in parallel in the inside of a capacitor element further includes a plurality of capacitor components connected electrically in series. With an element including such a series structure, even when breakdown occurs in one of the capacitor components connected in series, the other capacitor component maintains electrical isolation so that high reliability can be obtained.

Decrease in thickness of an element in an effective portion or increase in number of layers in the effective portion in the structure in Japanese Patent Laid-Open No. 8-37126 to meet the demand for a multilayer ceramic capacitor higher in capacitance is a great technical challenge, and it is difficult to achieve. For further improvement in performance, a structure capable of achieving both of a capacitance density and a BDV rather than the series structure as in Japanese Patent Laying-Open No. 8-37126 is required.

SUMMARY OF THE INVENTION

Preferred embodiments of the present invention provide multilayer ceramic capacitors that a are each able to be higher in capacitance density and breakdown voltage than a series structure and mount structures for multilayer ceramic capacitors.

A multilayer ceramic capacitor according to a preferred embodiment of the present invention includes a multilayer body including a plurality of layered dielectric layers and a plurality of layered internal electrode layers, the multilayer body including a first main surface and a second main surface opposed to each other in a direction of layering, a first side surface and a second side surface opposed to each other in a width direction orthogonal or substantially orthogonal to the direction of layering, and a first end surface and a second end surface opposed to each other in a length direction orthogonal or substantially orthogonal to the direction of layering and the width direction, and an external electrode provided on the multilayer body. The external electrode includes a first external electrode provided on the first end surface, a second external electrode provided on the second end surface, and a third external electrode and a fourth external electrode provided on one or both of the first side surface and the second side surface. The internal electrode layer is provided on the dielectric layer and includes a first internal electrode layer connected to the first external electrode, a second internal electrode layer connected to the second external electrode, a third internal electrode layer connected to the third external electrode, and a fourth internal electrode layer connected to the fourth external electrode. The first internal electrode layer includes a first opposing electrode portion opposed to the second internal electrode layer and a first drawn electrode portion extending to the first end surface. The second internal electrode layer includes a second opposing electrode portion opposed to the first internal electrode layer and a second drawn electrode portion extending to the second end surface. The third internal electrode layer is provided at a distance from the first internal electrode layer and located between a vicinity of a tip end of the first opposing electrode portion of the first internal electrode layer and the second drawn electrode portion of the second internal electrode layer adjacent in the direction of layering. The fourth internal electrode layer is provided at a distance from the second internal electrode layer and located between a vicinity of a tip end of the second opposing electrode portion of the second internal electrode layer and the first drawn electrode portion of the first internal electrode layer adjacent in the direction of layering.

With the multilayer ceramic capacitor in a preferred embodiment of the present invention, the third internal electrode layer is provided at a distance from the first internal electrode layer and located between a vicinity of the tip end of the first opposing electrode portion of the first internal electrode layer and the second drawn electrode portion of the second internal electrode layer adjacent in the direction of layering. The fourth internal electrode layer is provided at a distance from the second internal electrode layer and located between a vicinity of the tip end of the second opposing electrode portion of the second internal electrode layer and the first drawn electrode portion of the first internal electrode layer adjacent in the direction of layering.

In the multilayer ceramic capacitor, a potential applied to the first internal electrode layer and the second internal electrode layer and a potential applied to the third internal electrode layer and the fourth internal electrode layer are able to thus be different from each other.

The third internal electrode layer and the fourth internal electrode layer are consequently provided adjacently to the first internal electrode layer and the second internal electrode layer, respectively, and an electric field that goes around from the first drawn electrode portion of the first internal electrode layer to the tip end of the second internal electrode layer provided on a different dielectric layer and an electric field that goes around from the second drawn electrode portion of the second internal electrode layer to the tip end of the first internal electrode layer provided on a different dielectric layer are able to be significantly reduced or prevented.

According to preferred embodiments of the present invention, multilayer ceramic capacitors that are each able to have a higher capacitance density and breakdown voltage than a series structure and a mount structures for multilayer ceramic capacitors are able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
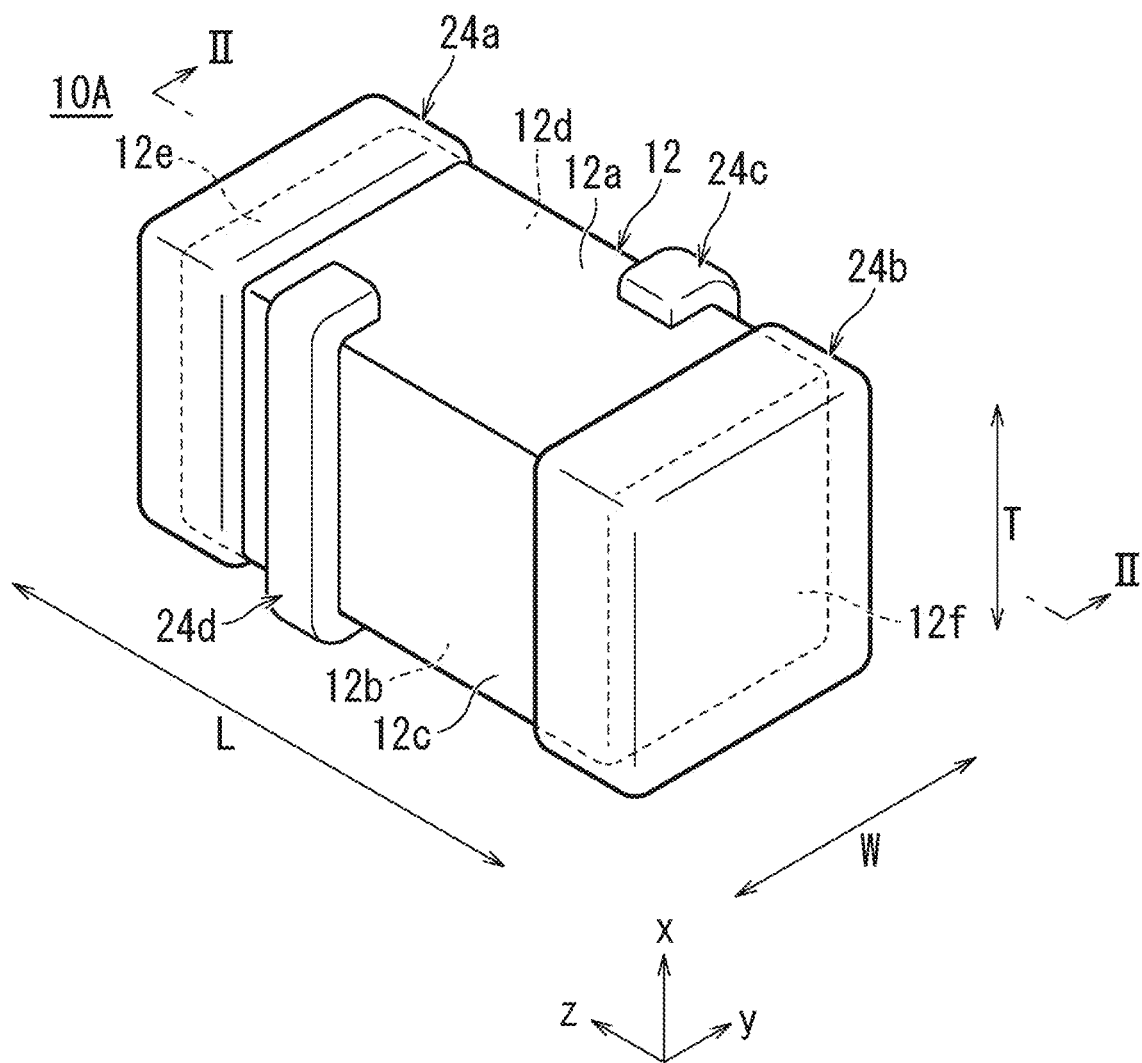
FIG. 1 is a perspective view of an exemplary multilayer ceramic capacitor according to a first preferred embodiment of the present invention.
Figure 2:
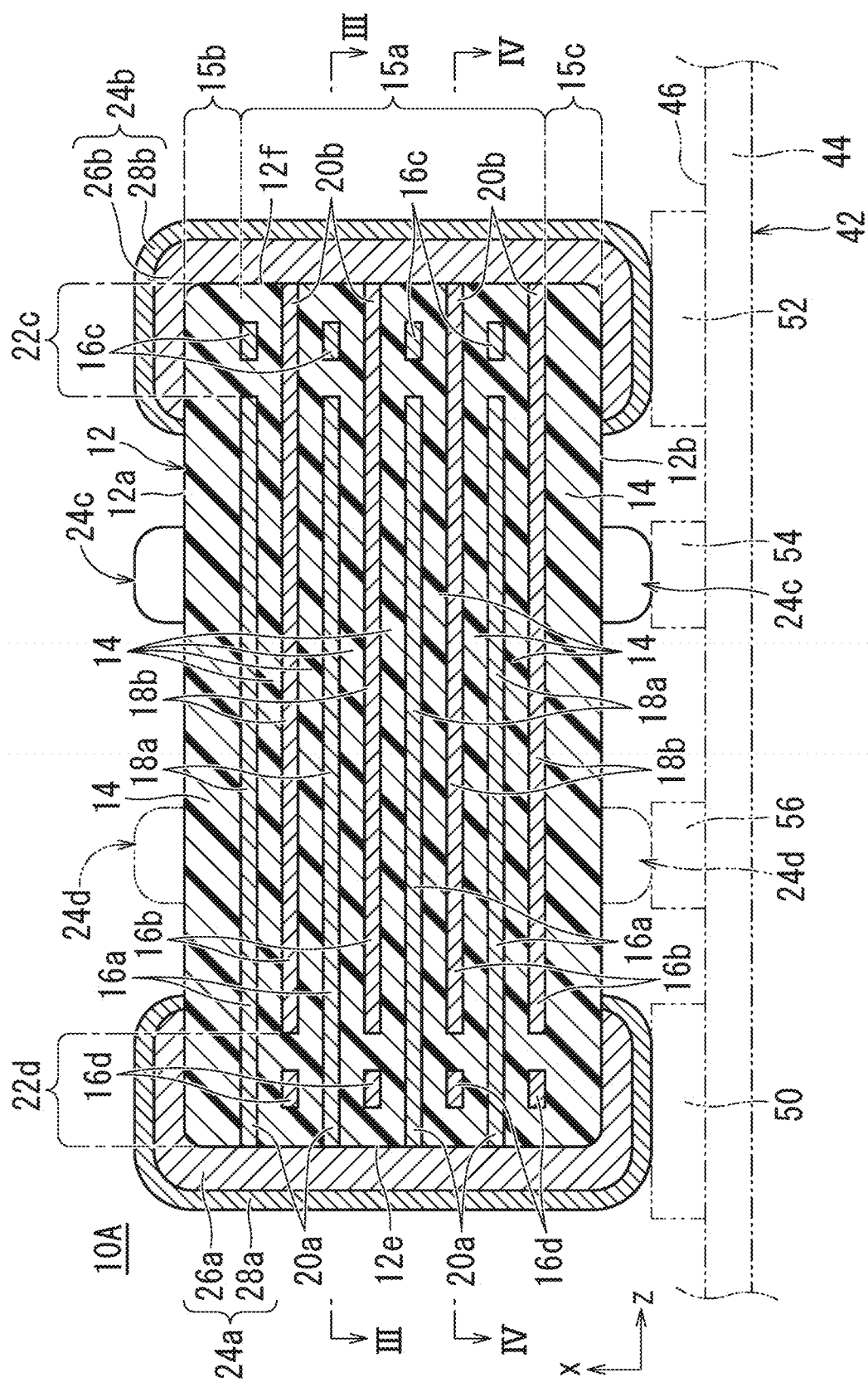
FIG. 2 is a cross-sectional view along the line II-II in FIG. 1.
Figure 3:
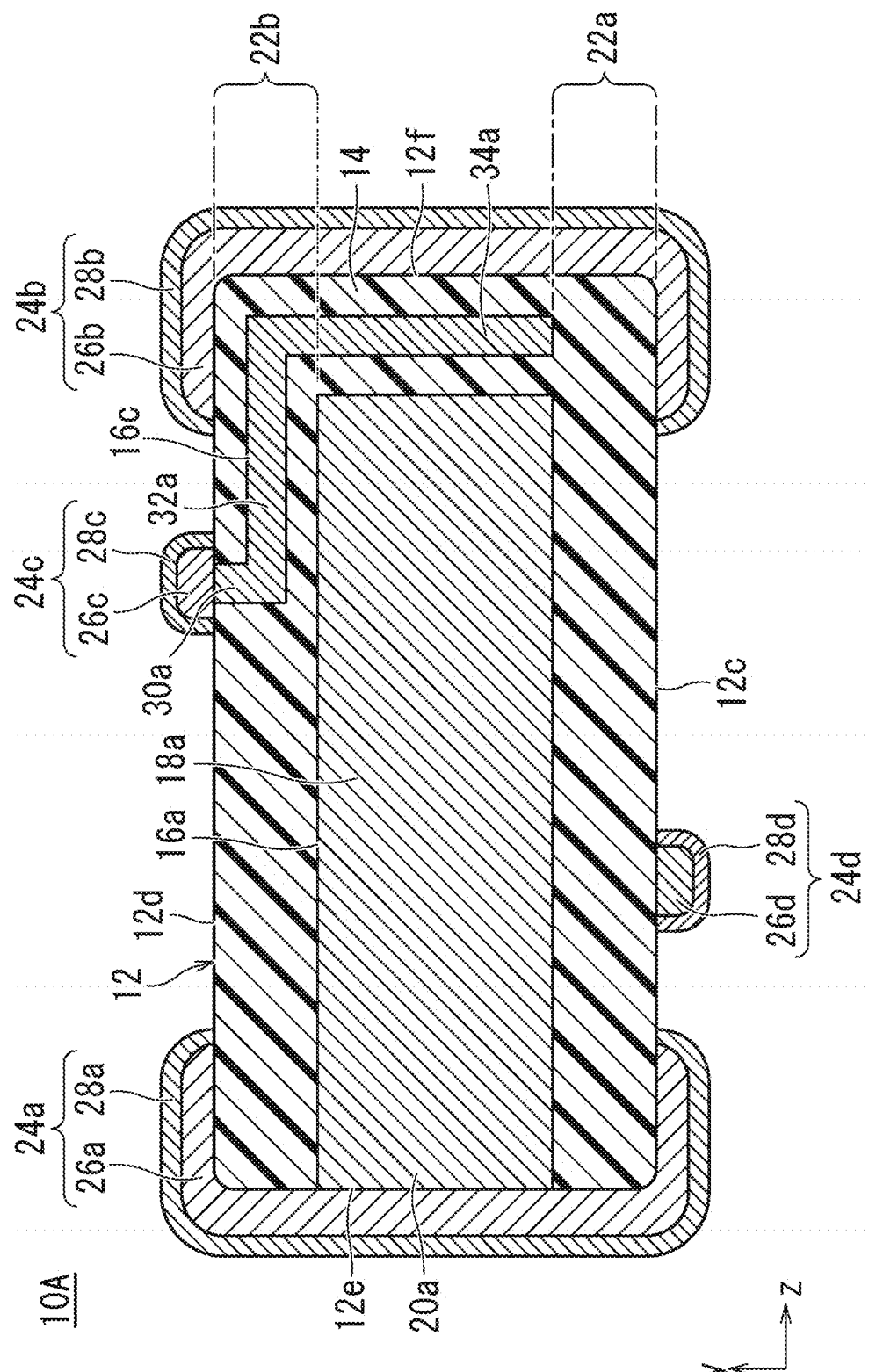
FIG. 3 is a cross-sectional view along the line III-III in FIG. 2.
Figure 4:
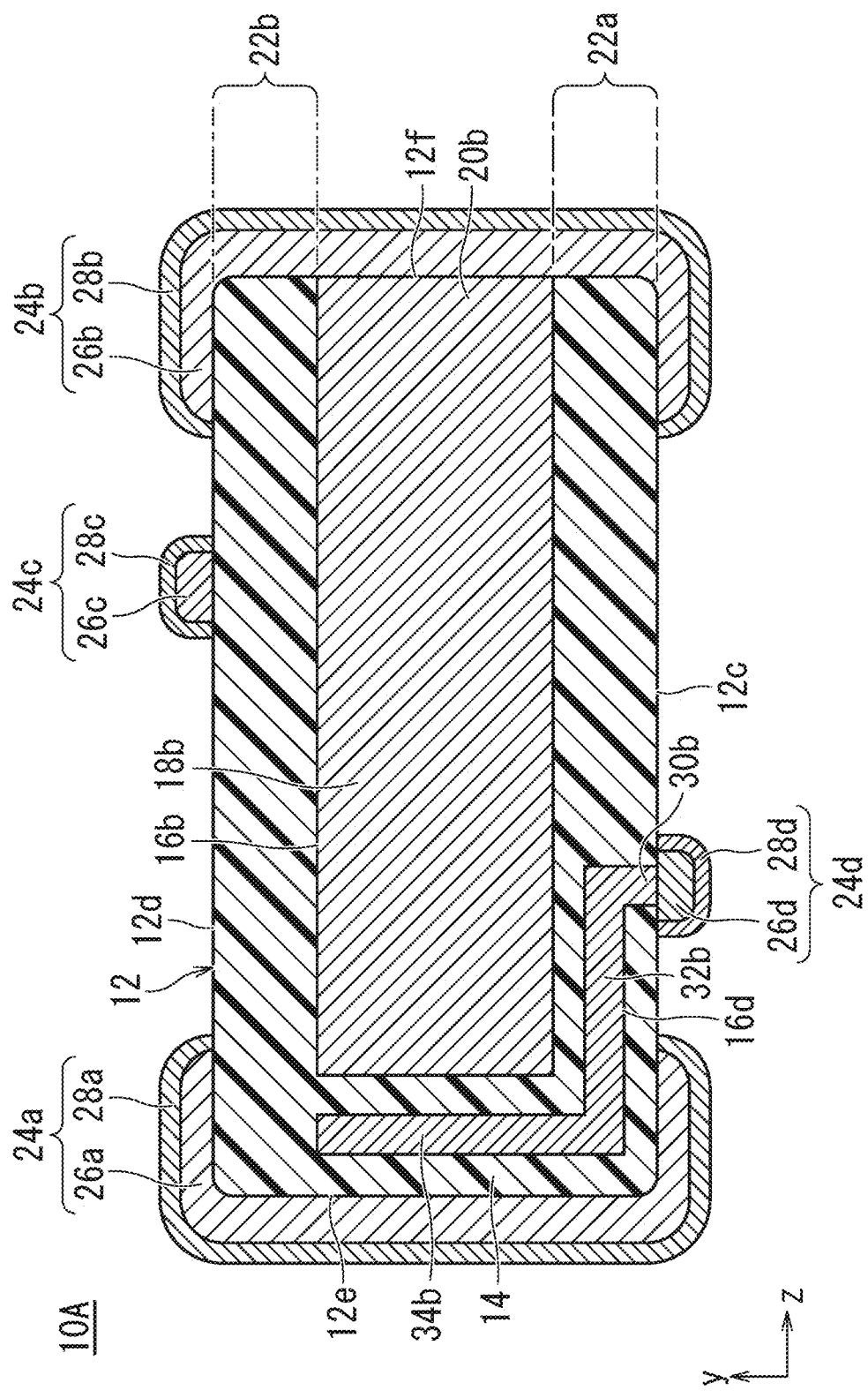
FIG. 4 is a cross-sectional view along the line IV-IV in FIG. 2.

A multilayer ceramic capacitor 10A according to a first preferred embodiment of the present invention will be described. FIG. 1 is a perspective view of an appearance showing an exemplary multilayer ceramic capacitor according to the first preferred embodiment. FIG. 2 is a cross-sectional view along the line II-II in FIG. 1. FIG. 3 is a cross-sectional view along the line III-III in FIG. 2. FIG. 4 is a cross-sectional view along the line IV-IV in FIG. 2.

As shown in FIGS. 1 to 4, multilayer ceramic capacitor 10A includes a multilayer body 12 having a parallelepiped shape and an external electrode 24.

Multilayer body 12 includes a plurality of dielectric layers 14 and a plurality of internal electrode layers 16 that are layered. Multilayer body 12 includes a first main surface 12a and a second main surface 12b opposed to each other in a direction of layering x, a first side surface 12c and a second side surface 12d opposed to each other in a width direction y orthogonal or substantially orthogonal to direction of layering x, and a first end surface 12e and a second end surface 12f opposed to each other in a length direction z orthogonal or substantially orthogonal to direction of layering x and width direction y. First main surface 12a and second main surface 12b of multilayer body 12 refer to surfaces in parallel or substantially in parallel to a surface (a mount surface) on which multilayer ceramic capacitor 10A is mounted. In particular, second main surface 12b is a surface that is actually mounted on the mount surface.

Multilayer body 12 preferably includes a corner and a ridgeline that are rounded, for example. The corner refers to a portion where three adjacent surfaces of the multilayer body meet one another and the ridgeline refers to a portion where two adjacent surfaces of the multilayer body meet each other. Projections and recesses or the like may be provided in a portion or the entirety of first main surface 12a and second main surface 12b, first side surface 12c and second side surface 12d, and first end surface 12e and second end surface 12f. A dimension in length direction z of multilayer body 12 is not necessarily longer than a dimension in width direction y.

Although the number of layered dielectric layers 14 is not particularly limited, the number is preferably, for example, not smaller than ten and not larger than one thousand (also including outer layer portions 15b and 15c which will be described later).

Multilayer body 12 includes an inner layer portion 15a defined by a single dielectric layer 14 or a plurality of dielectric layers 14 and a plurality of internal electrode layers 16 provided thereon and outer layer portions 15b and 15c each defined by a plurality of dielectric layers 14. Outer layer portion 15b is located on a side of first main surface 12a of multilayer body 12 and includes a plurality of dielectric layers 14 that are located between first main surface 12a and internal electrode layer 16 closest to first main surface 12a. Outer layer portion 15c is located on a side of second main surface 12b of multilayer body 12 and includes a plurality of dielectric layers 14 that are located between second main surface 12b and internal electrode layer 16 closest to second main surface 12b. A region lying between outer layer portions 15b and 15c is defined as inner layer portion 15a. Outer layer portions 15b and 15c each preferably have a thickness, for example, not smaller than about 50 µm and not larger than about 400 µm.

Although a dimension of multilayer body 12 is not particularly limited, preferably, for example, a dimension in length direction z is not smaller than about 0.2 mm and not larger than about 7.0 mm, a dimension in width direction y is not smaller than about 0.1 mm and not larger than about 6.0 mm, and a dimension in direction of layering x is not smaller than about 0.1 mm and not larger than about 3.0 mm.

Dielectric layer 14 may include, for example, a dielectric material. For example, dielectric ceramics including a component such as $BaTiO_3$, $CaTiO_3$, $SrTiO_3$, or $CaZrO_3$ may be included as a dielectric material. When the aforementioned dielectric material is included as a main component, depending on a predetermined characteristic of multilayer body 12, for example, a sub component lower in content than the main component, such as an Mn compound, an Fe compound, a Cr compound, a Co compound, or an Ni compound may be added.

Fired dielectric layer 14 preferably has a thickness not smaller than about 0.5 µm and not larger than about 30.0 µm, for example.

As shown in FIGS. 2 to 4, the plurality of layered internal electrode layers 16 include a plurality of first internal electrode layers 16a, a plurality of second internal electrode layers 16b, a plurality of third internal electrode layers 16c, and a plurality of fourth internal electrode layers 16d.

First internal electrode layer 16a is connected to a first external electrode 24a which will be described later.

Second internal electrode layer 16b is connected to a second external electrode 24b which will be described later.

Third internal electrode layer 16c is connected to a third external electrode 24c which will be described later.

Fourth internal electrode layer 16d is connected to a fourth external electrode 24d which will be described later.

As shown in FIGS. 2 and 3, first internal electrode layer 16a includes a first opposing electrode portion 18a opposed to second internal electrode layer 16b and a first drawn electrode portion 20a located on one end side of first internal electrode layer 16a and extending from first opposing electrode portion 18a to first end surface 12e of multilayer body 12. First drawn electrode portion 20a includes an end extended to first end surface 12e and exposed.

As shown in FIGS. 2 and 4, second internal electrode layer 16b includes a second opposing electrode portion 18b opposed to first internal electrode layer 16a and a second drawn electrode portion 20b located on one end side of second internal electrode layer 16b and extending from second opposing electrode portion 18b to second end surface 12f of multilayer body 12. Second drawn electrode portion 20b includes an end extended to second end surface 12f and exposed.

First internal electrode layer 16a and second internal electrode layer 16b each preferably have a thickness, for example, not smaller than about 0.2 µm and not larger than about 2.0 µm.

The total number of first internal electrode layers 16a and second internal electrode layers 16b is, for example, preferably not smaller than about five and not larger than about one thousand.

Though a shape of first opposing electrode portion 18a of first internal electrode layer 16a and second opposing electrode portion 18b of second internal electrode layer 16b is not particularly limited, a rectangular or substantially rectangular shape is preferred. The corner may be rounded or obliquely formed (tapered).

Although a shape of first drawn electrode portion 20a of first internal electrode layer 16a and second drawn electrode portion 20b of second internal electrode layer 16b is not particularly limited, a rectangular or substantially rectangular shape is preferred. The corner may be rounded or obliquely formed (tapered).

First opposing electrode portion 18a of first internal electrode layer 16a and first drawn electrode portion 20a of first internal electrode layer 16a may be equal or substantially equal in width to each other, or one of them may be smaller in width. Similarly, second opposing electrode portion 18b of second internal electrode layer 16b and second drawn electrode portion 20b of second internal electrode layer 16b may be equal or substantially equal in width to each other, or one of them may be smaller in width.

As shown in FIGS. 2 and 3, third internal electrode layer 16c is provided at a distance from first internal electrode layer 16a and located between a vicinity of the tip end of first opposing electrode portion 18a of first internal electrode layer 16a and second drawn electrode portion 20b of second internal electrode layer 16b adjacent in direction of layering x. Specifically, third internal electrode layer 16c includes a third drawn electrode portion 30a drawn to first side surface 12c and extending in width direction y that connects first side surface 12c and second side surface 12d to each other, a first extension 32a connected to third drawn electrode portion 30a and extending in length direction z that connects first end surface 12e and second end surface 12f to each other, and a second extension 34a connected to first extension 32a and extending in width direction y that connects first side surface 12c and second side surface 12d to each other.

As shown in FIGS. 2 and 4, fourth internal electrode layer 16d is provided at a distance from second internal electrode layer 16b and located between a vicinity of the tip end of second opposing electrode portion 18b of second internal electrode layer 16b and first drawn electrode portion 20a of first internal electrode layer 16a adjacent in direction of layering x. Specifically, fourth internal electrode layer 16d includes a fourth drawn electrode portion 30b drawn to second side surface 12d and extending in width direction y that connects first side surface 12c and second side surface 12d to each other, a third extension 32b connected to fourth drawn electrode portion 30b and extending in length direction z that connects first end surface 12e and second end surface 12f to each other, and a fourth extension 34b connected to third extension 32b and extending in width direction y that connects first side surface 12c and second side surface 12d to each other.

Third internal electrode layer 16c is located on the same dielectric layer 14 on which first internal electrode layer 16a is provided. Third internal electrode layer 16c thus does not have to be provided in a different layer, which may lead to a decrease in number of layers and may contribute to a reduction in cost.

Fourth internal electrode layer 16d is located on the same dielectric layer 14 on which second internal electrode layer 16*b* is provided. Fourth internal electrode layer 16*d* thus does not have to be provided in a different layer, which may lead to a decrease in number of layers and may contribute to a reduction in cost.

Third internal electrode layer 16*c* is located on the same dielectric layer 14 on which first internal electrode layer 16*a* is provided, and first internal electrode layer 16*a* and third internal electrode layer 16*c* are able to be simultaneously printed by the same or similar printing pattern (a printing plate). Fourth internal electrode layer 16*d* is located on the same dielectric layer 14 where second internal electrode layer 16*b* is provided, and second internal electrode layer 16*b* and fourth internal electrode layer 16*d* are able to be simultaneously printed. Printing that is accurate in position is thus able to be performed. Therefore, a distance between first internal electrode layer 16*a* and third internal electrode layer 16*c* and a distance between second internal electrode layer 16*b* and fourth internal electrode layer 16*d* are thus readily able to be maintained constant and a stable effect of significant improvement in BDV is able to be provided.

First extension 32*a* of third internal electrode layer 16*c* and third extension 32*b* of fourth internal electrode layer 16*d* extend in directions opposite to each other.

An interval between a side of first extension 32*a* of third internal electrode layer 16*c* on a side of first side surface 12*c* and a side at an end on a side of second side surface 12*d*, of first opposing electrode portion 18*a* of first internal electrode layer 16*a* is preferably not shorter than about 5 μm and not longer than about 100 μm, for example. Electric field that is concentrated in the side at the end on the side of second side surface 12*d*, of first opposing electrode portion 18*a* of first internal electrode layer 16*a* is thus able to be relaxed.

An interval between a side of third extension 32*b* of fourth internal electrode layer 16*d* on a side of second side surface 12*d* and a side at an end on a side of first side surface 12*c*, of second opposing electrode portion 18*b* of second internal electrode layer 16*b* is preferably not shorter than about 5 μm and not longer than 100 μm, for example. Electric field that is concentrated in the side at the end on the side of first side surface 12*c*, of second opposing electrode portion 18*b* of second internal electrode layer 16*b* is thus able to be relaxed.

An interval between a side of second extension 34*a* of third internal electrode layer 16*c* on a side of first end surface 12*e* and a side at an end on a side of second end surface 12*f*, of first opposing electrode portion 18*a* of first internal electrode layer 16*a* is preferably not shorter than about 5 μm and not longer than about 100 μm, for example. Since electric field that is concentrated in the side at the end on the side of second end surface 12*f*, of first opposing electrode portion 18*a* of first internal electrode layer 16*a* is thus able to be relaxed, an effect of significant improvement in value of a capacitance density×a BDV due to significant improvement in BDV is able to be provided as compared with a structure in which the structure of the present preferred embodiment is not provided.

An interval between a side of fourth extension 34*b* of fourth internal electrode layer 16*d* on a side of second end surface 12*f* and a side at an end on a side of first end surface 12*e*, of second opposing electrode portion 18*b* of second internal electrode layer 16*b* is preferably not shorter than about 5 μm and not longer than about 100 μm, for example. Since electric field that is concentrated in the side at the end on the side of first end surface 12*e*, of second opposing electrode portion 18*b* of second internal electrode layer 16*b* is thus able to be relaxed, an effect of significant improvement in value of a capacitance density×a BDV due to significant improvement in BDV is able to be provided as compared with the structure in which the structure of the present preferred embodiment is not provided.

Multilayer body 12 includes a side portion (W gap) 22*a* of multilayer body 12 provided between one ends in width direction y of first opposing electrode portion 18*a* and second opposing electrode portion 18*b* and first side surface 12*c* and a side portion (W gap) 22*b* of multilayer body 12 provided between the other ends in width direction y of first opposing electrode portion 18*a* and second opposing electrode portion 18*b* and second side surface 12*d*.

Multilayer body 12 includes an end (L gap) 22*c* of multilayer body 12 provided between an end opposite to first drawn electrode portion 20*a* of first internal electrode layer 16*a* and second end surface 12*f* and an end (L gap) 22*d* of multilayer body 12 provided between an end opposite to second drawn electrode portion 20*b* of second internal electrode layer 16*b* and first end surface 12*e*.

Internal electrode layer 16 may preferably be made of an appropriate conductive material including, for example, a metal such as Ni, Cu, Ag, Pd, or Au and an alloy including at least one of those metals, such as an Ag—Pd alloy.

In multilayer ceramic capacitor 10A according to a preferred embodiment of the present invention, first internal electrode layer 16*a* and second internal electrode layer 16*b* are opposed to each other with dielectric layer 14 interposed between first internal electrode layer 16*a* and second internal electrode layer 16*b*, and a capacitance is generated and characteristics of the capacitor are provided.

External electrode 24 includes first external electrode 24*a*, second external electrode 24*b*, third external electrode 24*c*, and fourth external electrode 24*d*.

First external electrode 24*a* is provided on a surface of first end surface 12*e* of multilayer body 12 and extends from first end surface 12*e* to cover a portion of each of first main surface 12*a*, second main surface 12*b*, first side surface 12*c*, and second side surface 12*d*. Accordingly, first external electrode 24*a* is electrically connected to first drawn electrode portion 20*a* of first internal electrode layer 16*a*. First external electrode 24*a* preferably, for example, extends at least to a portion of first main surface 12*a* or a portion of second main surface 12*b* of multilayer body 12 that is located on a side of a mount surface.

Second external electrode 24*b* is provided on a surface of second end surface 12*f* of multilayer body 12 and extends from second end surface 12*f* to cover a portion of each of first main surface 12*a*, second main surface 12*b*, first side surface 12*c*, and second side surface 12*d*. Accordingly, second external electrode 24*b* is electrically connected to second drawn electrode portion 20*b* of second internal electrode layer 16*b*. Second external electrode 24*b* preferably, for example, extends at least to a portion of first main surface 12*a* or a portion of second main surface 12*b* of multilayer body 12 that is located on the side of the mount surface.

Third external electrode 24*c* is provided on one or both of first side surface 12*c* and second side surface 12*d*. Third external electrode 24*c* is connected to third internal electrode layer 16*c* and extends over first side surface 12*c* to a portion of first main surface 12*a* and a portion of second main surface 12*b*. Third external electrode 24*c* may be provided only on first side surface 12*c* or second side surface 12*d*. A shape of third external electrode 24*c* provided on a portion of first main surface 12*a* and a portion of second main surface 12*b* is not particularly limited.

Fourth external electrode 24*d* is provided on one or both of first side surface 12*c* and second side surface 12*d*. Fourth external electrode 24*d* is connected to fourth internal electrode layer 16d and extends over second side surface 12d to a portion of first main surface 12a and a portion of second main surface 12b. Fourth external electrode 24d may be provided only on first side surface 12c or second side surface 12d. A shape of fourth external electrode 24d provided on a portion of first main surface 12a and a portion of second main surface 12b is not particularly limited.

First external electrode 24a includes a first underlying electrode layer 26a provided on multilayer body 12 and a first plated layer 28a provided to cover a surface of first underlying electrode layer 26a.

Second external electrode 24b includes a second underlying electrode layer 26b provided on multilayer body 12 and a second plated layer 28b provided to cover a surface of second underlying electrode layer 26b.

Third external electrode 24c includes a third underlying electrode layer 26c provided on multilayer body 12 and a first plated layer 28c provided to cover a surface of third underlying electrode layer 26c.

Fourth external electrode 24d includes a fourth underlying electrode layer 26d provided on multilayer body 12 and a second plated layer 28d provided to cover a surface of fourth underlying electrode layer 26d.

First underlying electrode layer 26a, second underlying electrode layer 26b, third underlying electrode layer 26c, and fourth underlying electrode layer 26d (which are also simply referred to as an underlying electrode layer below) each includes at least one selected from a baked layer, a conductive resin layer, a thin layer, and the like.

Initially, first underlying electrode layer 26a, second underlying electrode layer 26b, third underlying electrode layer 26c, and fourth underlying electrode layer 26d each formed from a baked layer will be described.

The baked layer includes glass and a metal. The metal for the baked layer preferably includes at least one selected, for example, from Cu, Ni, Ag, Pd, an Ag—Pd alloy, Au, and the like. Glass for the baked layer preferably includes, for example, at least one selected from B, Si, Ba, Mg, Al, Li, and the like. The baked layer may be defined by a plurality of layers. The baked layer is provided by applying a conductive paste including glass and a metal to multilayer body 12 and baking the conductive paste, and it may be fired simultaneously or substantially simultaneously with dielectric layer 14 and internal electrode layer 16 or may be baked after firing of dielectric layer 14 and internal electrode layer 16.

The baked layer in a central portion in a height direction of the underlying electrode layer located on each of first end surface 12e and second end surface 12f preferably has a thickness not smaller than about 5 μm and not larger than about 300 μm, for example.

When the underlying electrode layer is provided on first main surface 12a and second main surface 12b and on first side surface 12c and second side surface 12d, the baked layer in a central portion in length direction z in each of first underlying electrode layer 26a and second underlying electrode layer 26b located on first main surface 12a and second main surface 12b and on first side surface 12c and second side surface 12d preferably has a thickness, for example, not smaller than about 5 μm and not larger than about 300 μm.

First underlying electrode layer 26a, second underlying electrode layer 26b, third underlying electrode layer 26c, and fourth underlying electrode layer 26d formed from a conductive resin layer will now be described.

The conductive resin layer may be provided on a surface of the baked layer to cover the baked layer or directly on the surface of multilayer body 12. The conductive resin layer may be defined by a plurality of layers.

The conductive resin layer includes a thermosetting resin and a metal. Since the conductive resin layer includes a thermosetting resin, it is more flexible than a conductive layer formed, for example, from a plated film or a fired product of a conductive paste. Therefore, even though a physical shock or a shock originating from a thermal cycle is applied to the multilayer ceramic capacitor, the conductive resin layer defines and functions as a buffer layer and is able to significantly reduce or prevent a crack in the multilayer ceramic capacitor.

Ag, Cu, or an alloy thereof may preferably be used as a metal to be included in the conductive resin layer, for example. Alternatively, metal powders including a surface coated with Ag may be used. Metal powders including a surface coated with Ag, Cu or Ni are preferably used for the metal powders, for example. Cu subjected to antioxidation treatment may also be used. In particular, conductive metal powders of Ag as a metal to be included in the conductive resin layer is preferred because Ag is suitable as an electrode material because of its specific resistance lowest among metals and Ag which is a precious metal is not oxidized and is highly weather resistant. A metal coated with Ag as a metal to be included in the conductive resin layer is preferred because a metal as a base material is inexpensive while the characteristics of Ag are maintained.

The conductive resin layer preferably includes at least about 35 vol % and at most about 75 vol % of metal with respect to a volume of the conductive resin as a whole, for example.

A shape of the metal (conductive filler) included in the conductive resin layer is not particularly limited. Although the conductive filler may be spherical or may have a flat profile, spherical metal powders and metal powders having a flat profile are preferably mixed, for example.

An average particle size of the metal (conductive filler) included in the conductive resin layer is not particularly limited. The conductive filler may preferably have an average particle size, for example, not smaller than about 0.3 μm and not larger than about 10 μm.

The metal (conductive filler) included in the conductive resin layer mainly provides current conduction in the conductive resin layer. Specifically, a current conduction path is provided in the conductive resin layer as a result of contact between the conductive fillers.

Various known thermosetting resins, for example, an epoxy resin, a phenol resin, a urethane resin, a silicone resin, and a polyimide resin may preferably be used as the resin in the conductive resin layer. Among these, the epoxy resin having excellent heat resistance, moisture resistance, and adhesiveness is one of preferred resins.

The conductive resin layer preferably includes at least about 25 vol % and at most about 65 vol % of resin with respect to the volume of the conductive resin as a whole, for example.

The conductive resin layer preferably includes a hardening agent together with the thermosetting resin, for example. When the epoxy resin is included as a base resin, various known compounds, for example, a phenol-based compound, an amine-based compound, an acid anhydride-based compound, and an imidazole-based compound may preferably be included as the hardening agent for the epoxy resin.

The conductive resin layer in the central portion in height direction x in the underlying electrode layer located on each of first end surface 12e and second end surface 12f preferably has a thickness, for example, not smaller than about 5 μm and not larger than about 300 μm.

When the underlying electrode layer is provided on first main surface 12a and second main surface 12b and on first side surface 12c and second side surface 12d, the conductive resin layer in the central portion in length direction z in the underlying electrode layer located on each of first main surface 12a and second main surface 12b and on first side surface 12c and second side surface 12d preferably has a thickness not smaller than about 5 μm and not larger than about 300 μm, for example.

When the underlying electrode layer is formed from a thin layer, the thin layer is a layer not larger than about 1 μm, for example, that is formed as deposition of metal particles by a thin film formation method, for example, sputtering or vapor deposition.

First plated layer 28a and second plated layer 28b (which are simply also referred to as a plated layer below) preferably include, for example, at least one selected, for example, from Cu, Ni, Sn, Ag, Pd, an Ag—Pd alloy, Au, and the like.

The plated layer may include a plurality of layers. Accordingly, the plated layer preferably has a two-layered structure including an Ni plated layer and an Sn plated layer, for example. By providing the Ni plated layer to cover a surface of the underlying electrode layer, corrosion of the underlying electrode layer by solder to mount the multilayer ceramic capacitor 10A is able to be significantly reduced or prevented in mounting multilayer ceramic capacitor 10A. By further providing the Sn plated layer on a surface of the Ni plated layer, in mounting multilayer ceramic capacitor 10A, wettability of solder to mount the multilayer ceramic capacitor 10A is able to be significantly improved to facilitate mounting.

One plated layer preferably has a thickness not smaller than about 0.5 μm and not larger than about 10.0 μm, for example.

External electrode 24 may be defined only by a plated layer without providing an underlying electrode layer. A structure where a plated layer is provided without an underlying electrode layer will be described below.

In each of first external electrode 24a, second external electrode 24b, third external electrode 24c, and fourth external electrode 24d, no underlying electrode layer may be provided but a plated layer may be provided directly on the surface of multilayer body 12. Specifically, multilayer ceramic capacitor 10A may include a structure including a plated layer electrically connected to internal electrode layer 16. Accordingly, a catalyst may be provided on the surface of multilayer body 12 as pre-treatment and thereafter a plated layer may be formed.

The plated layer preferably includes a lower plated electrode provided on the surface of multilayer body 12 and an upper plated electrode provided on a surface of the lower plated electrode, for example.

Each of the lower plated electrode and the upper plated electrode preferably includes at least one metal selected, for example, from Cu, Ni, Sn, Pb, Au, Ag, Pd, Bi, and Zn or an alloy including such a metal.

The lower plated electrode is preferably made of Ni that performs a solder barrier function and the upper plated electrode is preferably made of Sn or Au excellent in solderability, for example. For example, when internal electrode layer 16 is made of Ni, the lower plated electrode is preferably made of Cu that is able to be securely joined to Ni. The upper plated electrode may be provided or may be omitted, and each of first external electrode 24a, second external electrode 24b, third external electrode 24c, and fourth external electrode 24d may include only the lower plated electrode.

The upper plated electrode may define and function as an outermost layer of the plated layer, or another plated electrode may further be provided on a surface of the upper plated electrode.

One plated layer provided without providing an underlying electrode layer preferably has a thickness not smaller than about 1 μm and not larger than about 15 μm, for example. The plated layer preferably includes no glass, for example. A ratio of a metal per unit volume of the plated layer is preferably not lower than about 99 vol %, for example.

A dimension in length direction z of multilayer ceramic capacitor 10A including multilayer body 12 and external electrode 24 is defined as an L dimension, a dimension in direction of layering x of multilayer ceramic capacitor 10A including multilayer body 12 and external electrode 24 is defined as a T dimension, and a dimension in width direction y of multilayer ceramic capacitor 10A including multilayer body 12 and external electrode 24 is defined as a W dimension.

Multilayer ceramic capacitor 10A preferably has, for example, the L dimension in length direction z not smaller than about 0.2 mm and not larger than about 7.0 mm, the W dimension in width direction y not smaller than about 0.1 mm and not larger than about 3.0 mm, and the T dimension in direction of layering x not smaller than about 0.1 mm and not larger than about 6.0 mm.

According to multilayer ceramic capacitor 10A shown in FIG. 1, as shown in FIGS. 2 and 3, third internal electrode layer 16c is provided at a distance from first internal electrode layer 16a and located between a vicinity of the tip end of first opposing electrode portion 18a of first internal electrode layer 16a and second drawn electrode portion 20b of second internal electrode layer 16b adjacent in direction of layering x, and as shown in FIGS. 2 and 4, fourth internal electrode layer 16d is provided at a distance from second internal electrode layer 16b and located between a vicinity of the tip end of second opposing electrode portion 18b of second internal electrode layer 16b and first drawn electrode portion 20a of first internal electrode layer 16a adjacent in direction of layering x.

Thus, in multilayer ceramic capacitor 10A shown in FIG. 1, a potential applied to first internal electrode layer 16a and second internal electrode layer 16b and a potential applied to third internal electrode layer 16c and fourth internal electrode layer 16d may be different from each other.

Therefore, by providing third internal electrode layer 16c and fourth internal electrode layer 16d adjacently to first internal electrode layer 16a and second internal electrode layer 16b, respectively, electric field that goes around from first drawn electrode portion 20a of first internal electrode layer 16a to the tip end of second internal electrode layer 16b provided on different dielectric layer 14 and electric field that goes around from second drawn electrode portion 20b of second internal electrode layer 16b to the tip end of first internal electrode layer 16a provided on different dielectric layer 14 is able to be significantly reduced or prevented.

Although electric field is concentrated also at a tip end of a portion of third internal electrode layer 16c opposed to first end surface 12e and second end surface 12f and a tip end of a portion of fourth internal electrode layer 16d opposed to first end surface 12e and second end surface 12f due to electric field that goes around, such a relationship of a voltage applied to first internal electrode layer 16a and second internal electrode layer 16b>a voltage applied to third internal electrode layer 16c and fourth internal electrode layer 16d is satisfied. Therefore, such a relationship as strength of electric field at the tip end of first internal electrode layer 16a and the tip end of second internal electrode layer 16b in the absence of third internal electrode layer 16c and fourth internal electrode layer 16d>strength of electric field at the tip end of first internal electrode layer 16a and the tip end of second internal electrode layer 16b in the presence of third internal electrode layer 16c and fourth internal electrode layer 16d is satisfied, and strength of electric field is able to be significantly reduced.

By application of a different potential to third internal electrode layer 16c and fourth internal electrode layer 16d, concentration of electric field at the tip end of first internal electrode layer 16a and the tip end of second internal electrode layer 16b on a side where the internal electrode is not extended to the end surface of multilayer body 12 is relaxed, and voltage breakdown at the tip end of first internal electrode layer 16a and the tip end of second internal electrode layer 16b is less likely to occur and a breakdown voltage (BDV) is able to be significantly improved without changing capacitance density.

Multilayer ceramic capacitor 10A shown in FIG. 1 may be larger in thickness of dielectric layer 14 in the effective portion and smaller in number of layered dielectric layers 14 in the effective portion than a multilayer ceramic capacitor including a series structure. Technical difficulty is thus able to be overcome rather than providing similar features and advantages in the multilayer ceramic capacitor including the series structure.

As set forth above, according to multilayer ceramic capacitor 10A shown in FIG. 1, a multilayer ceramic capacitor that having higher capacitance density and breakdown voltage than the series structure is able to be provided.

Figure 5:
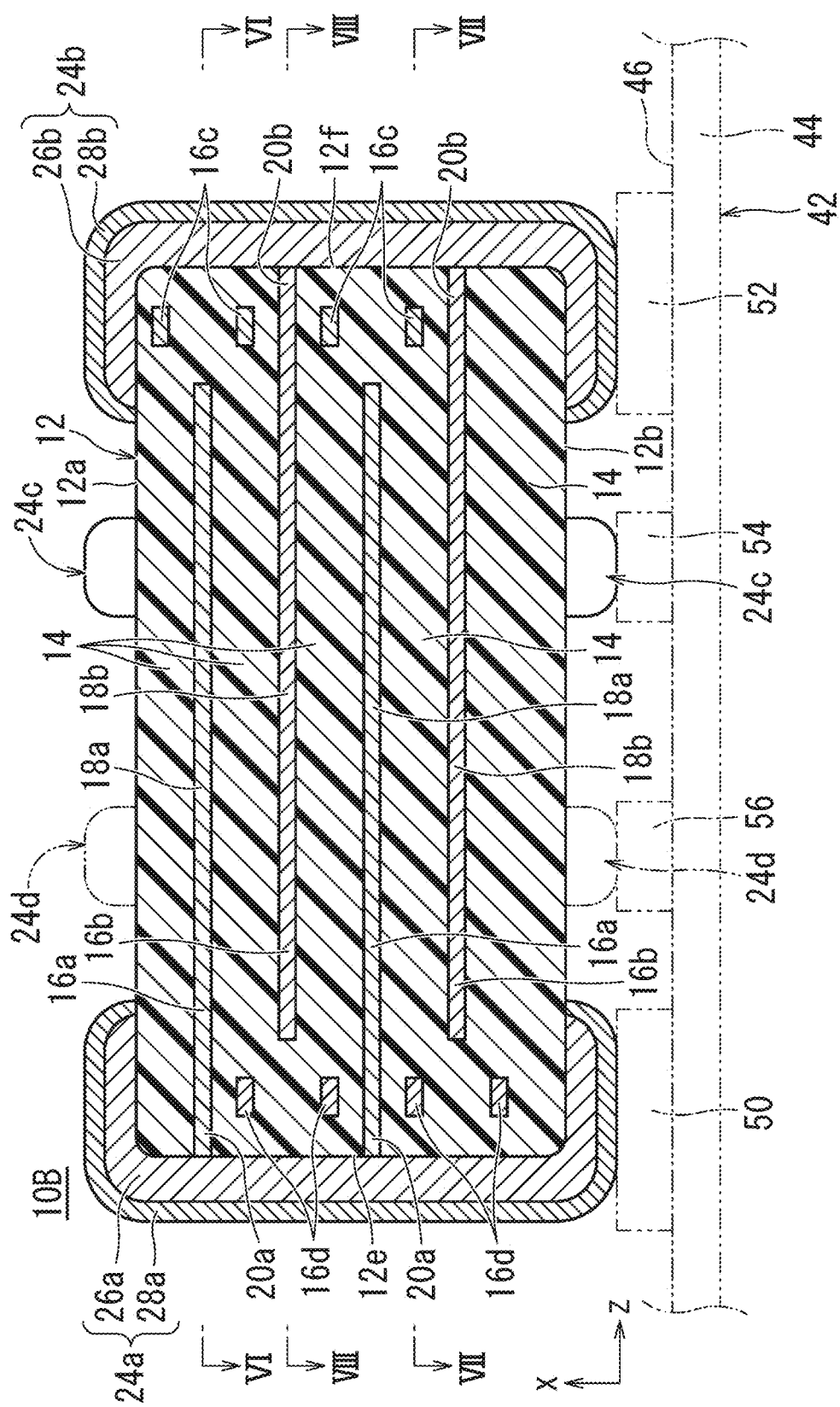
FIG. 5 is a cross-sectional view showing an exemplary multilayer ceramic capacitor according to a second preferred embodiment of the present invention and corresponding to FIG. 2.
Figure 6:
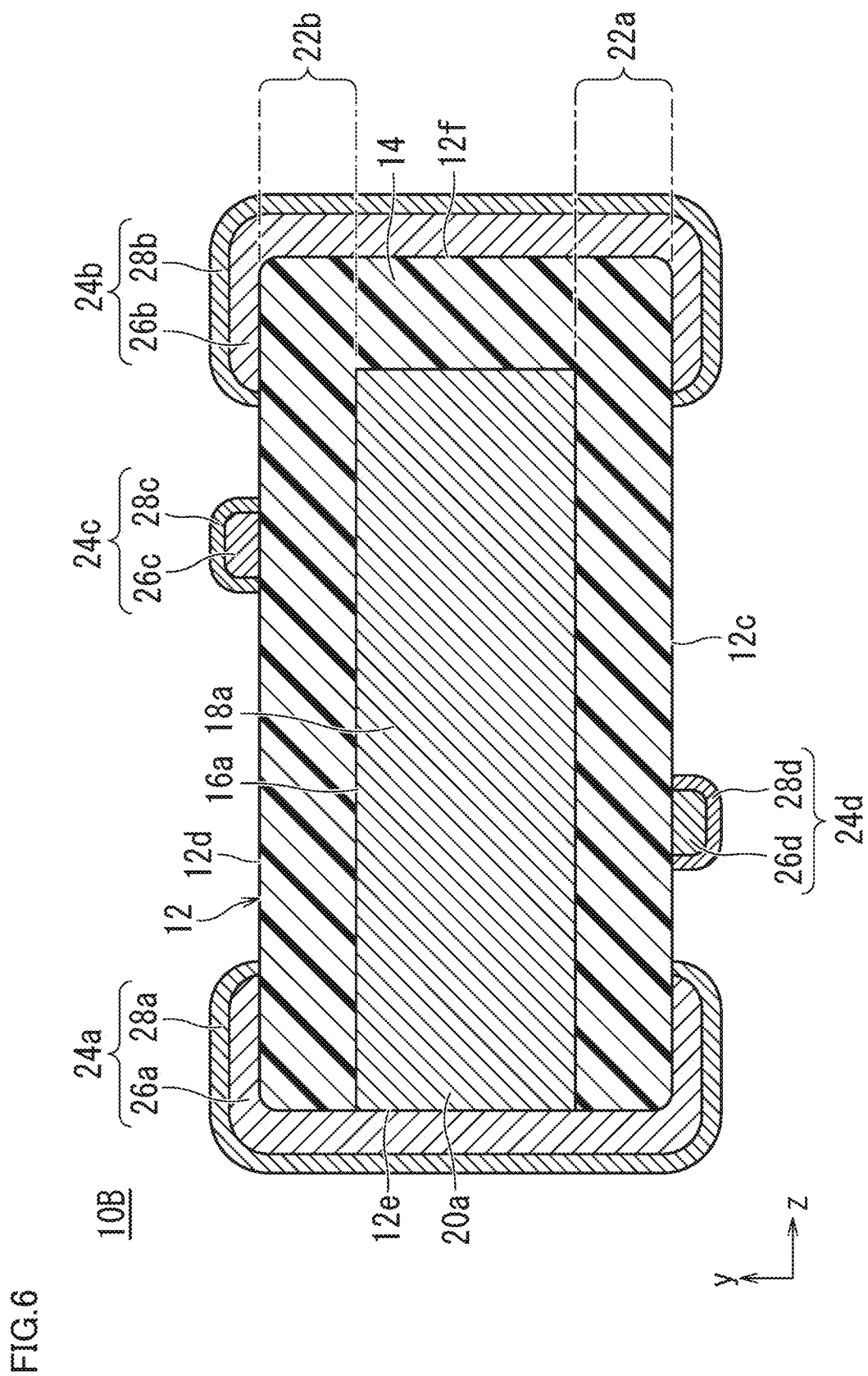
FIG. 6 is a cross-sectional view along the line VI-VI in FIG. 5.
Figure 7:
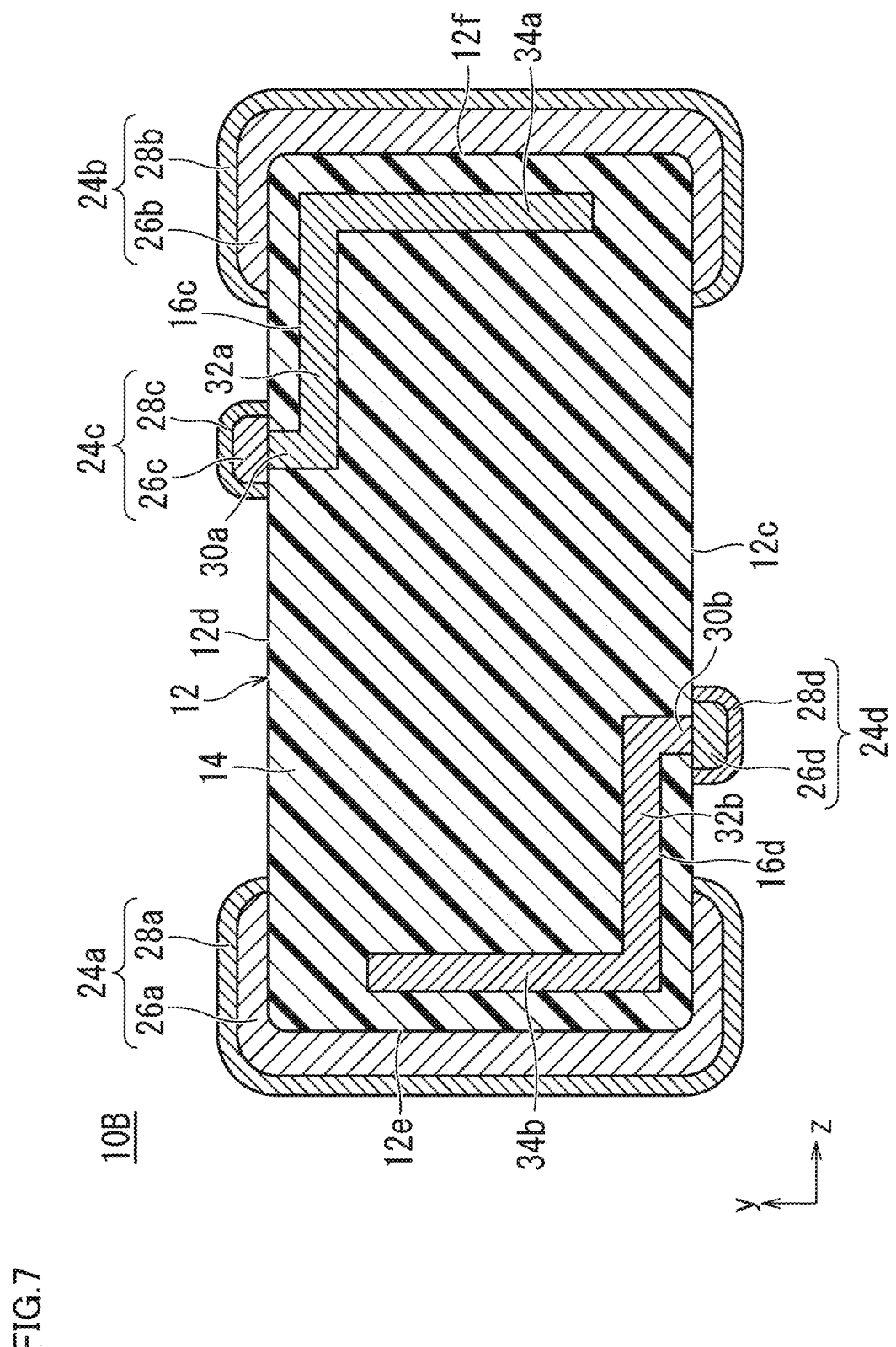
FIG. 7 is a cross-sectional view along the line VII-VII in FIG. 5.
Figure 8:
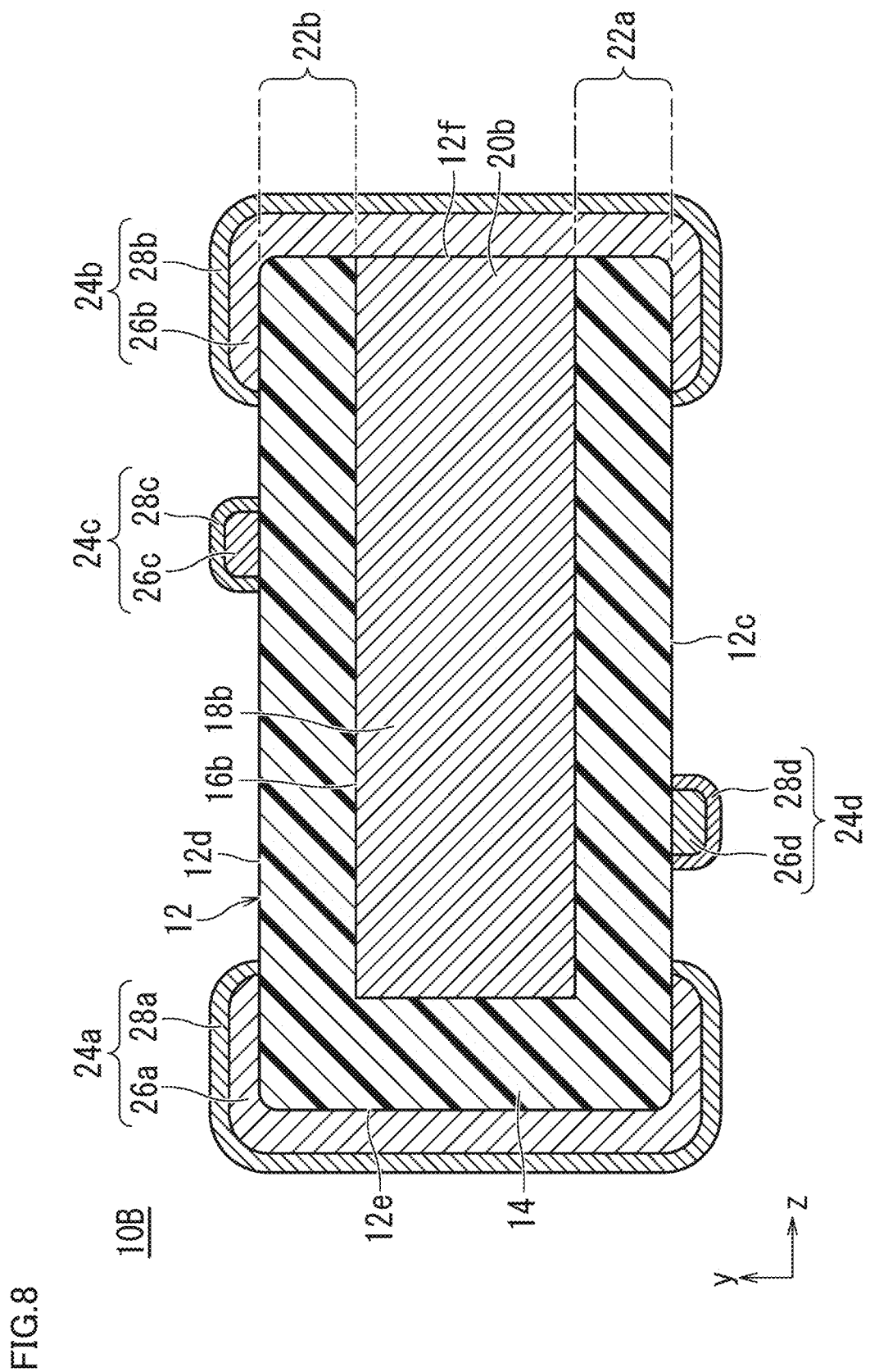
FIG. 8 is a cross-sectional view along the line VIII-VIII in FIG. 5.

A multilayer ceramic capacitor 10B according to a second preferred embodiment of the present invention will be described. FIG. 5 is a cross-sectional view showing an exemplary multilayer ceramic capacitor according to the second preferred embodiment and corresponding to FIG. 2. FIG. 6 is a cross-sectional view along the line VI-VI in FIG. 5. FIG. 7 is a cross-sectional view along the line VII-VII in FIG. 5. FIG. 8 is a cross-sectional view along the line VIII-VIII in FIG. 5.

Multilayer ceramic capacitor 10B according to the second preferred embodiment is similar to multilayer ceramic capacitor 10A in the first preferred embodiment shown in FIG. 1 except for a structure of internal electrode layer 16 in multilayer body 12. Therefore, portions the same as or similar to those in multilayer ceramic capacitor 10A are denoted by the same reference numerals and description thereof will not be provided.

As shown in FIGS. 5 to 7, third internal electrode layer 16c is provided on dielectric layer 14 different from dielectric layer 14 on which first internal electrode layer 16a is provided. Short-circuiting between first internal electrode layer 16a and third internal electrode layer 16c due to variation in accuracy in printing is thus able to be significantly reduced or prevented. Providing first internal electrode layer 16a and third internal electrode layer 16c on the same plane results in a decrease in area of first internal electrode layer 16a in correspondence with a structure of third internal electrode layer 16c, and a desired capacitance may not be provided. In contrast, by providing first internal electrode layer 16a and third internal electrode layer 16c on dielectric layers 14 different from each other, a capacitance is not affected and a desired capacitance is able to be provided.

As shown in FIGS. 5 to 7, fourth internal electrode layer 16d is provided on dielectric layer 14 different from dielectric layer 14 where second internal electrode layer 16d is provided. Short-circuiting between second internal electrode layer 16b and fourth internal electrode layer 16d due to variation in accuracy in printing is thus able to be significantly reduced or prevented. Providing second internal electrode layer 16b and fourth internal electrode layer 16d on the same plane results in a decrease in area of second internal electrode layer 16b in correspondence with a structure of fourth internal electrode layer 16d, and a desired capacitance may not be provided. In contrast, by providing second internal electrode layer 16b and fourth internal electrode layer 16d on dielectric layers 14 different from each other, a capacitance is not affected and a desired capacitance is able to be provided.

An interval between a side of second extension 34a of third internal electrode layer 16c on a side of first end surface 12e and a side at the end on the side of second end surface 12f, of first opposing electrode portion 18a of first internal electrode layer 16a is preferably not smaller than about 0.5 µm and not larger than about 100 µm, for example. Since electric field that is concentrated in the side at the end on the side of second end surface 12f, of first opposing electrode portion 18a of first internal electrode layer 16a is thus able to be relaxed, an effect of significant improvement in BDV as compared with the multilayer ceramic capacitor including the series structure is able to be provided.

A shortest distance between a surface of second extension 34a of third internal electrode layer 16c and a surface of second internal electrode layer 16b that are opposed to each other (that is, a thickness of dielectric layer 14 between second extension 34a of third internal electrode layer 16c and second internal electrode layer 16b) is preferably substantially equal to or larger than a thickness of dielectric layer 14 where third internal electrode layer 16c and fourth internal electrode layer 16d are provided, for example. Excessive concentration of electric field in the side of second extension 34a of third internal electrode layer 16c on the side of second end surface 12f is thus able to be avoided.

An interval between a side of fourth extension 34b of fourth internal electrode layer 16d on the side of second end surface 12f and a side at the end on the side of first end surface 12e, of second opposing electrode portion 18b of second internal electrode layer 16b is preferably not smaller than about 0.5 µm and not larger than about 100 µm, for example. Since electric field that is concentrated in the side at the end on the side of first end surface 12e, of second opposing electrode portion 18b of second internal electrode layer 16b is thus able to be relaxed, an effect of significant improvement in BDV as compared with the multilayer ceramic capacitor of the series structure is able to be provided.

A shortest distance between a surface of fourth extension 34b of fourth internal electrode layer 16d and a surface of first internal electrode layer 16a that are opposed to each other (that is, a thickness of dielectric layer 14 between fourth extension 34b of fourth internal electrode layer 16d and first internal electrode layer 16a) is preferably substantially equal to or larger than a thickness of dielectric layer 14 where third internal electrode layer 16c and fourth internal electrode layer 16d are provided, for example. Excessive concentration of electric field in the side of fourth extension 34b of fourth internal electrode layer 16d on the side of first end surface 12e is thus able to be avoided.

In multilayer ceramic capacitor 10B shown in FIG. 7, although third internal electrode layer 16c is extended to second side surface 12d through third drawn electrode portion 30a and fourth internal electrode layer 16d is extended to first side surface 12c through fourth drawn electrode portion 30b, limitation thereto is not intended. Third internal electrode layer 16c may be extended to first side surface 12c through third drawn electrode portion 30a and fourth internal electrode layer 16d may also be extended to first side surface 12c through fourth drawn electrode portion 30b. Accordingly, third external electrode 24c and fourth external electrode 24d may be provided only on the side of first side surface 12c.

Similarly, third internal electrode layer 16c may be extended to second side surface 12d through third drawn electrode portion 30a and fourth internal electrode layer 16d may also be extended to second side surface 12d through fourth drawn electrode portion 30b. Accordingly, third external electrode 24c and fourth external electrode 24d may be provided only on the side of second side surface 12d.

Multilayer ceramic capacitor 10B according to the second preferred embodiment provides features and advantages the same as or similar to features and advantages provided by multilayer ceramic capacitor 10A.

Figure 9:
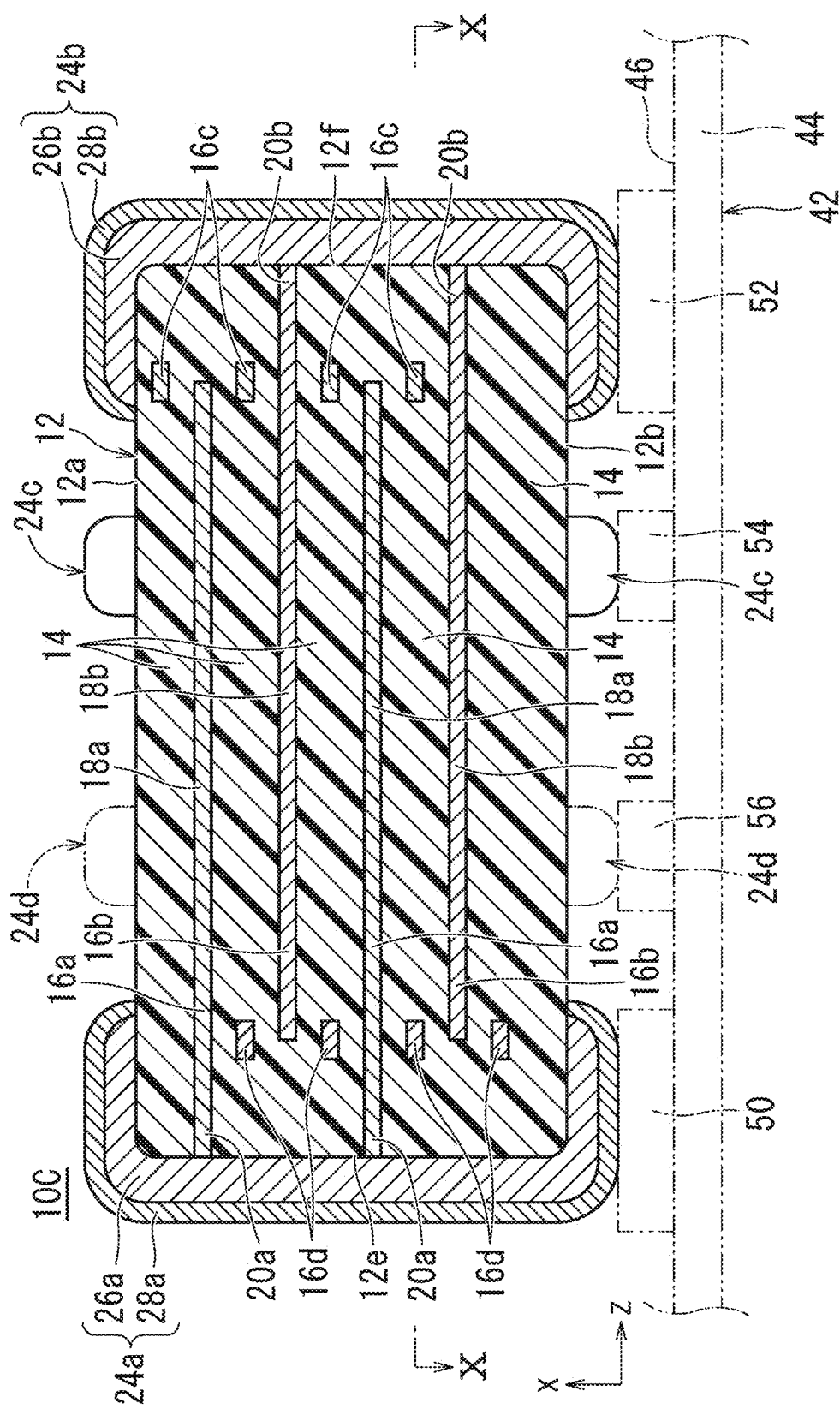
FIG. 9 is a cross-sectional view showing an exemplary multilayer ceramic capacitor according to a third preferred embodiment of the present invention and corresponding to FIG. 2.
Figure 10:
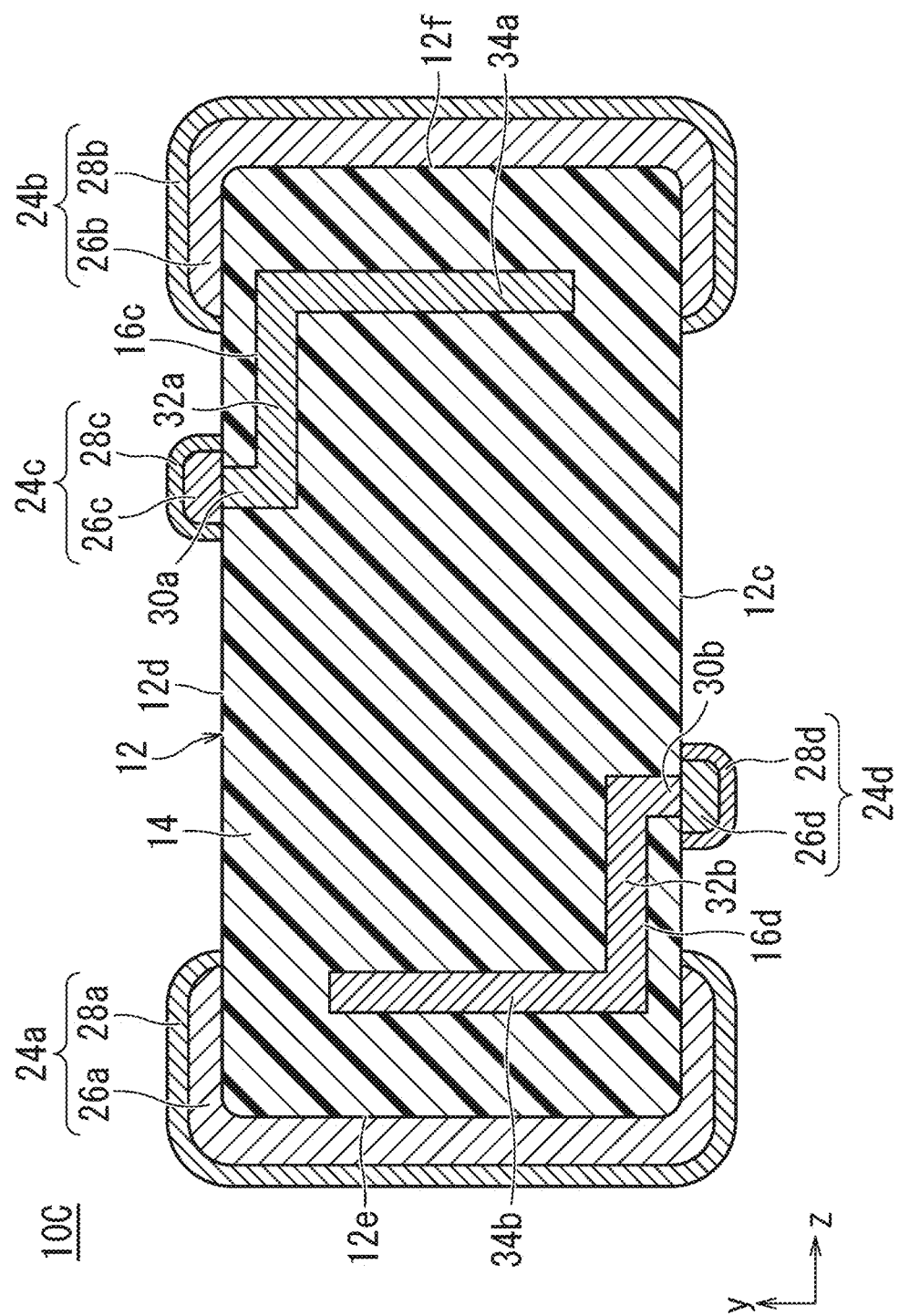
FIG. 10 is a cross-sectional view along the line X-X in FIG. 9.

A multilayer ceramic capacitor 10C according to a third preferred embodiment of the present invention will be described. FIG. 9 is a cross-sectional view showing an exemplary multilayer ceramic capacitor according to the third preferred embodiment and corresponding to FIG. 2. FIG. 10 is a cross-sectional view along the line X-X in FIG. 9.

Multilayer ceramic capacitor 10C according to the third preferred embodiment is similar to multilayer ceramic capacitor 10A in the first preferred embodiment shown in FIG. 1 except for a structure of internal electrode layer 16 in multilayer body 12. Therefore, portions the same as or similar to those in multilayer ceramic capacitor 10A are denoted by the same reference numerals and description thereof will not be provided.

As shown in FIGS. 9 and 10, third internal electrode layer 16c is provided on dielectric layer 14 different from dielectric layer 14 where first internal electrode layer 16a is provided. The tip end of first opposing electrode portion 18a of first internal electrode layer 16a and third internal electrode layer 16c are provided to overlap with each other. When the tip end of first opposing electrode portion 18a of first internal electrode layer 16a and third internal electrode layer 16c are provided to overlap with each other, design not dependent on accuracy in position of printing may be implemented while the features and advantages described above are further improved. Thus, the features and advantages described above are able to be more reliably provided.

In multilayer ceramic capacitor 10C shown in FIG. 10, although third internal electrode layer 16c is extended to second side surface 12d through third drawn electrode portion 30a and fourth internal electrode layer 16d is extended to first side surface 12c through fourth drawn electrode portion 30b, limitation thereto is not intended. Third internal electrode layer 16c may be extended to first side surface 12c through third drawn electrode portion 30a and fourth internal electrode layered 16d may also be extended to first side surface 12c through fourth drawn electrode portion 30b. Accordingly, third external electrode 24c and fourth external electrode 24d may be provided only on the side of first side surface 12c.

Similarly, third internal electrode layer 16c may be extended to second side surface 12d through third drawn electrode portion 30a and fourth internal electrode layer 16d may also be extended to second side surface 12d through fourth drawn electrode portion 30b. Accordingly, third external electrode 24c and fourth external electrode 24d may be provided only on the side of second side surface 12d.

As shown in FIGS. 9 and 10, fourth internal electrode layer 16d is provided on dielectric layer 14 different from dielectric layer 14 on which second internal electrode layer 16b is provided. The tip end of second opposing electrode portion 18b of second internal electrode layer 16b and fourth internal electrode layer 16d are provided to overlap with each other. When the tip end of second opposing electrode portion 18b of second internal electrode layer 16b and fourth internal electrode layer 16d are thus provided to overlap with each other, design not dependent on accuracy in position of printing is able to be performed while the features and advantages described above are further improved. Thus, the features and advantages described above are able to be more reliably provided.

Multilayer ceramic capacitor 10C according to the third preferred embodiment provides features and advantages the same as or similar to features and advantages provided by multilayer ceramic capacitor 10A.

Figure 11:
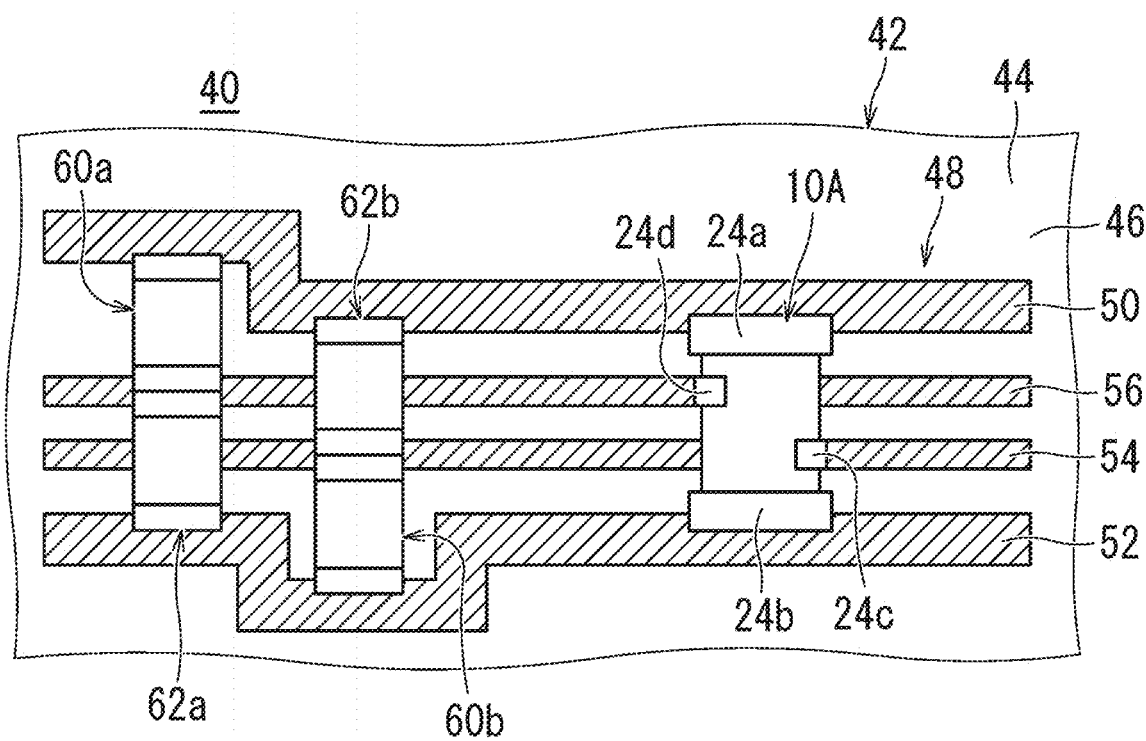
FIG. 11 is a plan view showing a mount structure for a multilayer ceramic capacitor according to a preferred embodiment of the present invention.

A mount structure 40 for the multilayer ceramic capacitor described above will be described with reference, for example, to FIG. 11 in particular. FIG. 11 is a plan view showing a mount structure for a multilayer ceramic capacitor according to a preferred embodiment of the present invention.

As shown, for example, in FIG. 11, mount structure 40 for the multilayer ceramic capacitor includes two first resistive elements 60a and 60b of a surface mount type and two second resistive elements 62a and 62b of a surface mount type, multilayer ceramic capacitor 10A, and a mount substrate 42. Mount substrate 42 includes a substrate main body 44. For example, a substrate main body including a glass epoxy resin or an alumina material may be provided as substrate main body 44. Substrate main body 44 may be defined, for example, by a plurality of layered insulator layers.

Mount substrate 42 includes a mount surface 46 on one main surface. A first circuit pattern 50 to which a high potential is applied, a second circuit pattern 52 that is grounded, and a third circuit pattern 54 and a fourth circuit pattern 56 juxtaposed between first circuit pattern 50 and second circuit pattern 52 are provided on mount surface 46 of mount substrate 42.

A conductor material, for example, Cu, Ag, Al, or Au may preferably be used as a material for first circuit pattern 50, second circuit pattern 52, third circuit pattern 54, and fourth circuit pattern 56.

Two first resistive elements 60a and 60b and two second resistive elements 62a and 62b are, for example, chip-type resistive elements. Two first resistive elements 60a and 60b and two second resistive elements 62a and 62b each include a resistive body having a parallelepiped shape and external electrodes provided on opposing end surfaces of the resistive body.

One first resistive element 60a is connected between first circuit pattern 50 and fourth circuit pattern 56 adjacent to first circuit pattern 50 with the external electrode interposed between first circuit pattern 50 and fourth circuit pattern 56, and the other first resistive element 60b is connected to second circuit pattern 52 and third circuit pattern 54 adjacent to second circuit pattern 52 with the external electrode interposed between second circuit pattern 52 and third circuit pattern 54.

One second resistive element 62a is connected between second circuit pattern 52 and fourth circuit pattern 56 with the external electrode interposed between second circuit pattern 52 and fourth circuit pattern 56, and the other second resistive element 62b is connected between first circuit pattern 50 and third circuit pattern 54 with the external electrode interposed between first circuit pattern 50 and third circuit pattern 54.

For example, a resistor of a surface mount type including an insulating material is preferable, for example, as the resistor of two first resistive elements 60a and 60b and two second resistive elements 62a and 62b. A resistance value of the resistor of two first resistive elements 60a and 60b and two second resistive elements 62a and 62b is preferably within a range not lower than about 10Ω and not higher than about 1 MΩ, for example.

In multilayer ceramic capacitor 10A, first external electrode 24a is connected to first circuit pattern 50, second external electrode 24b is connected to second circuit pattern 52, third external electrode 24c is connected to third circuit pattern 54, and fourth external electrode 24d is connected to fourth circuit pattern 56.

A voltage applied to first circuit pattern 50 is divided by first resistive elements 60a and 60b and second resistive elements 62a and 62b and a resultant voltage is applied to third circuit pattern 54 and fourth circuit pattern 56.

In mount structure 40 for the multilayer ceramic capacitor shown in FIG. 11, in multilayer ceramic capacitor 10A, first external electrode 24a is connected to first circuit pattern 50 to which a high voltage is applied and second external electrode 24b is connected to second circuit pattern 52 connected to the ground. Then, by selecting an appropriate resistor from first resistive elements 60a and 60b and second resistive elements 62a and 62b and according to a voltage resulting from voltage division by the resistor, a voltage to be applied to third circuit pattern 54 and fourth circuit pattern 56 is able to be selectively regulated.

Since a potential applied to first internal electrode layer 16a and second internal electrode layer 16b and a potential applied to third internal electrode layer 16c and fourth internal electrode layer 16d are thus able to be different from each other in multilayer ceramic capacitor 10A, by application of a different potential to third internal electrode layer 16c and fourth internal electrode layer 16d, electric field concentrated at the tip end of the internal electrode layer on the side where the internal electrode is not drawn to the end surface of multilayer body 12 is able to be relaxed.

In mount structure 40 for the multilayer ceramic capacitor shown in FIG. 11, although voltages different from each other is able to be selectively applied to third circuit pattern 54 and fourth circuit pattern 56 by using first resistive elements 60a and 60b and second resistive elements 62a and 62b, limitation thereto is not intended. A voltage may be directly applied to each of third circuit pattern 54 and fourth circuit pattern 56 by another power supply.

In mount structure 40 for the multilayer ceramic capacitor shown in FIG. 11, multilayer ceramic capacitor 10B or 10C is also able to be mounted.

A non-limiting example of a method of manufacturing a multilayer ceramic capacitor according to a preferred embodiment of the present invention will now be described.

Initially, a ceramic green sheet and a conductive paste for an internal electrode are prepared. Although the ceramic green sheet and the conductive paste for the internal electrode include a binder and a solvent, a known organic binder or a known organic solvent may be included.

Then, the conductive paste for the internal electrode is printed in a predetermined pattern on the ceramic green sheet, for example, by screen printing or gravure printing to form an internal electrode pattern.

In succession, a layered sheet is provided by layering a predetermined number of ceramic green sheets for an outer layer on which the internal electrode pattern is not printed, successively layering thereon the ceramic green sheets on which the internal electrode pattern has been printed, and layering thereon a predetermined number of ceramic green sheets for the outer layer on which the internal electrode pattern is not printed.

The layered sheet may be compression-bonded in the direction of layering by isostatic pressing or the like, for example, to provide a layered block.

Thereafter, the layered block is cut in a predetermined shape having a predetermined dimension to provide a raw multilayer body chip.

In succession, the raw multilayer body chip is fired to manufacture multilayer body 12. A temperature to fire the raw multilayer body chip is preferably not lower than about 900° C. and not higher than about 1300° C., for example, although it is dependent on a dielectric or a material for the internal electrode layer.

In succession, external electrode 24 is formed on multilayer body 12.

Initially, third external electrode 24c and fourth external electrode 24d are formed.

A method of forming an underlying electrode layer in an example where the underlying electrode layer is made of a baked layer in third external electrode 24c and fourth external electrode 24d will be described.

To form third external electrode 24c and fourth external electrode 24d, for example, a conductive paste for the external electrode including a glass component and a metal is applied to an exposed portion of the third drawn electrode portion of the third internal electrode layer exposed through the first side surface of the surface of the multilayer body and baked to form the third underlying electrode layer. Similarly, to form the baked layer of the external electrode, for example, the conductive paste for the external electrode including the glass component and the metal is applied to an exposed portion of the fourth drawn electrode portion of the fourth internal electrode layer exposed through the second side surface of the multilayer body and baked to form the fourth underlying electrode layer. A temperature to bake the multilayer body is preferably not lower than about 700° C. and not higher than about 900° C., for example.

Various methods may be used as the method of forming the baked layer.

For example, a method of extruding a conductive paste through a slit and applying the conductive paste may be used. In this method, a turn-back portion may be longer by increasing an amount of extrusion of the conductive paste.

Other than the above method, a roller transfer method may be used. In the roller transfer method, a turn-back portion may be longer by increasing a pressure in roller transfer.

A method of forming an underlying electrode layer in forming the underlying electrode layer from a conductive resin layer in third external electrode 24c and fourth external electrode 24d will now be described.

When the underlying electrode layer is formed from a conductive resin layer, the conductive resin layer is able to be formed by a method below, for example. The conductive resin layer may be formed on a surface of the baked layer or the conductive resin layer alone may directly be formed on the multilayer body without forming the baked layer. In the method of forming a conductive resin layer, the conductive resin layer is formed by applying a conductive resin paste including a thermosetting resin and a metal component onto the baked layer or the multilayer body, subjecting the conductive resin paste to heat treatment preferably at a temperature not lower than about 250° C. and not higher than about 550° C., for example, and thermally curing the resin. An $N_2$ atmosphere is preferably applied as an atmosphere for heat treatment, for example. To reduce or prevent scattering of the resin and oxidation of various metal components, a concentration of oxygen is preferably reduced to about 100 ppm or lower, for example. The method of extruding a conductive resin paste through a slit and applying the conductive resin paste or the roller transfer method described above may be used as the method of applying the conductive resin paste.

A method of forming an underlying electrode layer in forming the underlying electrode layer from a thin layer in third external electrode 24c and fourth external electrode 24d will be described.

In forming the underlying electrode layer from a thin layer, the underlying electrode layer is able to be formed by a thin film formation method, for example, sputtering or vapor deposition. The underlying electrode layer formed from the thin layer is a layer preferably not larger than about 1 μm, for example, that results from deposition of metal particles.

A plated layer may be provided on an exposed portion of the internal electrode layer of the multilayer body without providing an underlying electrode layer in third external electrode 24c and fourth external electrode 24d. Accordingly, the plated layer is able to be formed by a method below.

The third internal electrode layer and the fourth internal electrode layer on the first side surface and the second side surface of the multilayer body are plated to form an underlying plated film on the exposed portion of the internal electrode layer. In plating, for example, any of electrolytic plating and electroless plating may be applied. Electroless plating, however, is disadvantageous due to its complicated process, because it typically requires pre-treatment with a catalyst to significantly improve a rate of precipitation of plating. Therefore, electrolytic plating is preferably applied, for example. Barrel plating is preferably applied as a plating method, for example. An upper plated electrode formed on a surface of a lower plated electrode may similarly be formed or may be omitted. When the third underlying electrode layer and the fourth underlying electrode layer are extends to a portion of the first main surface and a portion of the second main surface, however, electroless plating is applied.

Thereafter, a plated layer is formed on the surface of the underlying electrode layer in the third external electrode and the fourth external electrode, on the surface of the conductive resin layer or the surface of the underlying plated layer, and on the surface of the upper plated layer. In the present preferred embodiment, an Ni plated layer and an Sn plated layer are formed on the baked layer. The Ni plated layer and the Sn plated layer are successively formed, for example, by barrel plating.

In succession, first external electrode 24a and second external electrode 24b are formed.

A method of forming an underlying electrode layer in an example where the underlying electrode layer includes a baked layer in first external electrode 24a and second external electrode 24b will be described.

To form a baked layer of first external electrode 24a and second external electrode 24b, for example, a conductive paste for the external electrode including a glass component and a metal is applied by a method such as, for example, dipping to an exposed portion of the first drawn electrode portion of the first internal electrode layer exposed through the first end surface of the surface of the multilayer body and baked to form the first underlying electrode layer. Similarly, to form the baked layer of the external electrode, for example, the conductive paste for the external electrode including the glass component and the metal is applied by a method such as dipping, for example, to an exposed portion of the second drawn electrode portion of the second internal electrode layer exposed through the second end surface of the multilayer body and baked to form the second underlying electrode layer. A temperature to bake the multilayer body is preferably not lower than about 700° C. and not higher than about 900° C., for example.

A method of forming an underlying electrode layer in forming the underlying electrode layer from a conductive resin layer in first external electrode 24a and second external electrode 24b will now be described.

The conductive resin layer may be formed on the surface of the baked layer or the conductive resin layer alone may directly be formed on the surface of the multilayer body without forming the baked layer.

In a method of forming the conductive resin layer, the conductive resin layer is formed by applying a conductive resin paste including a thermosetting resin and a metal component to a surface of the baked layer or the multilayer body, subjecting the conductive resin paste to heat treatment preferably at a temperature not lower than about 250° C. and not higher than about 550° C., for example, and thermally curing the resin. An $N_2$ atmosphere is preferably applied as an atmosphere for heat treatment, for example. To significantly reduce or prevent scattering of the resin and oxidation of various metal components, a concentration of oxygen is preferably reduced to about 100 ppm or lower, for example.

A method of forming an underlying electrode layer in forming the underlying electrode layer from a thin layer in first external electrode 24a and second external electrode 24b will be described.

In forming the underlying electrode layer from a thin layer, the underlying electrode layer is able to be formed by a thin film formation method, for example, sputtering or vapor deposition. The underlying electrode layer formed from the thin layer is a layer preferably not larger than about 1 μm, for example, that results from deposition of metal particles.

A plated layer may be provided on an exposed portion of the internal electrode layer of the multilayer body without providing an underlying electrode layer in the first external electrode and the second external electrode. Accordingly, the plated layer is able to be formed by a method below.

The first end surface and the second end surface of the multilayer body are plated to form an underlying plated electrode on the exposed portion of the internal electrode layer. In plating, any of electrolytic plating and electroless plating, for example, may be applied. Electroless plating, however, is disadvantageous in complicated process, because it typically requires pre-treatment with a catalyst to significantly improve a rate of precipitation of plating. Therefore, electrolytic plating may be applied. Barrel plating is preferably applied as a plating method, for example. An upper plated electrode may similarly be formed on a surface of a lower plated electrode or may be omitted.

Thereafter, a plated layer is formed on the surface of the underlying electrode layer, on the surface of the conductive resin layer or the surface of the underlying plated layer, and on the surface of the upper plated layer to form the external electrode.

In each multilayer ceramic capacitor, an Ni plated layer and an Sn plated layer, for example, are formed as the plated layer on the surface of the baked layer. The Ni plated layer and the Sn plated layer are successively formed, for example, by barrel plating.

Multilayer ceramic capacitor 10A is manufactured as described above.

An experiment to confirm the features and advantages of the multilayer ceramic capacitor and the mount structure for the multilayer ceramic capacitor according to preferred embodiments of the present invention described above was conducted.

A multilayer ceramic capacitor according to Example with specifications as below was provided in accordance with the method of manufacturing the multilayer ceramic capacitor described above.

Size L×W×T of multilayer ceramic capacitor (including a designed value): about 5.7 mm×about 5.0 mm×about 1.5 mm
  Capacitance: see Table 1
  Material for dielectric layer: BaTiO3
  Thickness of dielectric layer: see Table 1
  Material for internal electrode layer: Ni
  Thickness of internal electrode layer: see Table 1
  Structure of external electrode
  Underlying electrode layer: electrode including conductive metal (Cu) and glass component
  Plated layer: two-layered structure of Ni plated layer and Sn plated layer The internal electrode layer in the multilayer ceramic capacitor according to the sample in Example 1 included the structure shown in FIG. 2.

In the mount structure for the multilayer ceramic capacitor in the experiment, the first resistive element that was mounted had a resistance of about 800Ω and the second resistive element had a resistance of about 200Ω. Therefore, a ratio of a voltage applied to the third circuit pattern to a voltage applied to the fourth circuit pattern was about 4:1.

The internal electrode layer in the multilayer ceramic capacitor according to the sample in Example 2 included the structure shown in FIG. 5.

In the mount structure for the multilayer ceramic capacitor in the experiment, the first resistive element that was mounted had a resistance of about 500Ω and the second resistive element had a resistance of about 500Ω. Therefore, a ratio of a voltage applied to the third circuit pattern to a voltage applied to the fourth circuit pattern was about 1:1.

The internal electrode layer in the multilayer ceramic capacitor according to the sample in Example 3 included the structure shown in FIG. 9.

In the mount structure for the multilayer ceramic capacitor in the experiment, the first resistive element that was mounted had a resistance of about 650Ω and the second resistive element had a resistance of about 350Ω. Therefore, a ratio of a voltage applied to the third circuit pattern to a voltage applied to the fourth circuit pattern was about 13:7.

Figure 12:
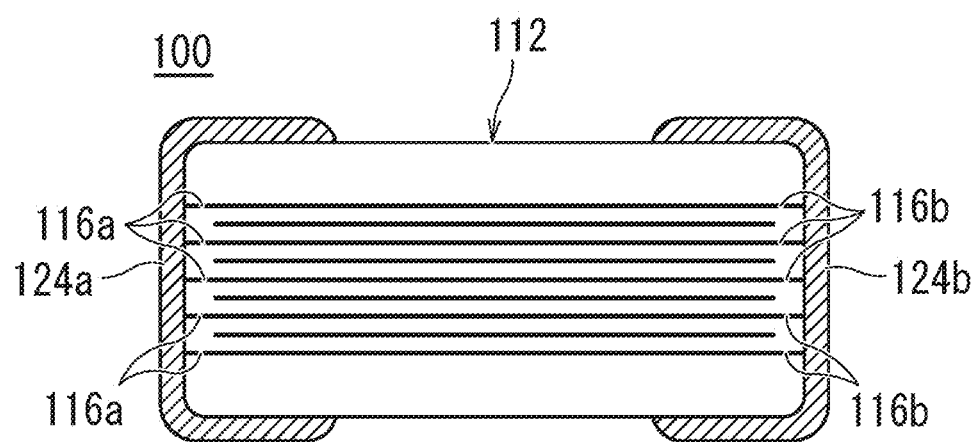
FIG. 12 is a cross-sectional view of a multilayer ceramic capacitor according to Comparative Example 1.
Figure 13:
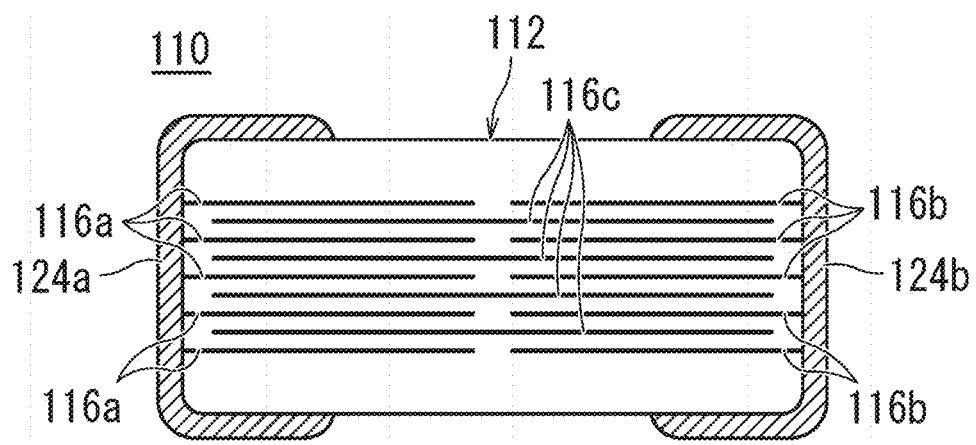
FIG. 13 is a cross-sectional view of a multilayer ceramic capacitor according to Comparative Example 2.

A multilayer ceramic capacitor shown in FIG. 12 was provided as the multilayer ceramic capacitor in Comparative Example 1 and a multilayer ceramic capacitor shown in FIG. 13 was provided as the multilayer ceramic capacitor in Comparative Example 2. Specifications are otherwise below, similarly to the specifications in Example.

Size L×W×T of multilayer ceramic capacitor (including a designed value): about 5.7 mm×about 5.0 mm×about 1.5 mm
  Capacitance: see Table 1
  Material for dielectric layer: $BaTiO_3$
  Thickness of dielectric layer: see Table 1
  Material for internal electrode layer: Ni
  Thickness of internal electrode layer: see Table 1
  Structure of external electrode
  Underlying electrode layer: electrode including conductive metal (Cu) and glass component
  Plated layer: two-layered structure of Ni plated layer and Sn plated layer A capacitance of the multilayer ceramic capacitor was measured with an LCR meter (an automatic balanced bridge method) under conditions including a temperature of about 25° C., alternating-current electric field of about 1.0 Vr·m·s, and a measurement frequency of about 1 kHz, and an average of thirty values was adopted as the capacitance.

The capacitance density was calculated by dividing a capacitance of the multilayer ceramic capacitor as the sample by a volume of the effective portion.

A method of measuring a BDV was performed in an order below.

(i) One multilayer ceramic capacitor as the sample was mounted on the circuit pattern shown in FIG. 11 together with two predetermined types of resistive elements. In the mount structure in Comparative Example 1 and Comparative Example 2, the first resistive element and the second resistive element were not included.

(ii) A direct-current voltage was applied to the first circuit pattern while it was raised at a rate of about 0.2 kV/s at a room temperature/an atmospheric pressure in the atmosphere. Since the second circuit pattern was grounded, about 0 V was applied.

(iii) A voltage at which short-circuiting occurred in the multilayer ceramic capacitor as the sample was defined as the BDV.

(iv) (i) to (iii) above were repeated thirty times and the average value was used as the average BDV.

The capacitance density was multiplied by the BDV and evaluation was performed based on that value. Performance of the multilayer ceramic capacitor was evaluated based on the value of the capacitance density×the BDV, because performance was better as the capacitance density and the BDV were higher.

Regarding a ratio to the series structure, a ratio of the capacitance density×the BDV of each structure to that in Comparative Example 2 was calculated.

Table 1 shows results of the experiment above.

TABLE 1

Ratio of Voltage Applied to Third Circuit

TABLE 1-continued

|  | Resistance Value of First Resistive Element (Ω) | Resistance Value of Second Resistive Element (Ω) | Pattern to Voltage Applied to Fourth Circuit Pattern | Thickness of Dielectric Layer (μm) | Thickness of Internal Electrode Layer (μm) | The Number of Dielectric Layers | Effective Area (mm²) | Volume of Effective Portion (mm³) |
|---|---|---|---|---|---|---|---|---|
| Comparative Example 1 | — | — | — | 26 | 1.0 | 29 | 16.9 | 784 |
| Comparative Example 2 | — | — | — | 13 | 1.0 | 56 | 8.0 | 785 |
| Example 1 | 800 | 200 | 4:1 | 26 | 1.0 | 29 | 16.9 | 784 |
| Example 2 | 500 | 500 | 1:1 | 26 | 1.0 | 29 | 16.9 | 784 |
| Example 3 | 650 | 350 | 13:7 | 26 | 1.0 | 29 | 16.9 | 784 |

|  | Dielectric Constant $\varepsilon_0$ of Vacuum (F/m) | Relative Permittivity $\varepsilon_r$ | Capacitance (nF) | Capacitance Density (F/m³) | Average BDV (kV) | Capacitance Density × BDV (F · V/m³) | Ratio to Capacitance Density × BDV in Comparative Example 2 |
|---|---|---|---|---|---|---|---|
| Comparative Example 1 | $8.85 \times 10^{-12}$ | 3420 | 571 | 43.1 | 1.78 | 76.7 | 0.89 |
| Comparative Example 2 | $8.85 \times 10^{-12}$ | 3420 | 524 | 39.5 | 2.17 | 85.7 | — |
| Example 1 | $8.85 \times 10^{-12}$ | 3420 | 571 | 43.1 | 2.15 | 92.8 | 1.08 |
| Example 2 | $8.85 \times 10^{-12}$ | 3420 | 571 | 43.1 | 2.04 | 88.0 | 1.03 |
| Example 3 | $8.85 \times 10^{-12}$ | 3420 | 571 | 43.1 | 2.20 | 95.0 | 1.11 |

It was discovered from the results above in Table 1 that Comparative Example 1 was smaller in value of the capacitance density×the BDV than Comparative Example 2 and naturally than Examples 1 to 3.

It was discovered in Table 1 that the value of the capacitance density×the BDV in Example 1 could be increased by about 1.08 times as compared with Comparative Example 2, that the value of the capacitance density×the BDV in Example 2 could be increased by about 1.03 times as compared with Comparative Example 2, although an increase was very slight, and that the value of the capacitance density×the BDV in Example 3 could be increased by about 1.11 times as compared with Comparative Example 2.

Based on the results above, with the mount structure for the multilayer ceramic capacitor described herein, in the multilayer ceramic capacitor, a potential applied to the first internal electrode layer and the second internal electrode layer and a potential applied to the third internal electrode layer and the fourth internal electrode layer may be different from each other. By application of a different potential to the third internal electrode layer and the fourth internal electrode layer, concentration of electric field at the tip end of the first internal electrode layer and the tip end of the second internal electrode layer on the side where the internal electrode layer is not drawn to the first end surface and the second end surface of the multilayer body is relaxed. Thus, voltage breakdown at the tip end of the first internal electrode layer and the tip end of the second internal electrode layer is less likely and a breakdown voltage (BDV) is able to be significantly improved without change in capacitance density.

According to the structure of the multilayer ceramic capacitor described herein, a thickness of the dielectric layer in the effective portion is able to be increased and the number of layers in the effective portion is able to be reduced. Therefore, it was discovered that technical difficulty could be overcome rather than providing similar features and advantages in the multilayer ceramic capacitor including the structure according to Comparative Example 2 which is the series structure.

As set forth above, preferred embodiments of the present invention provide multilayer ceramic capacitors that are each able to be higher in capacitance density and breakdown voltage than the series structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of layered dielectric layers and a plurality of layered internal electrode layers, the multilayer body including a first main surface and a second main surface opposed to each other in a direction of layering, a first side surface and a second side surface opposed to each other in a width direction orthogonal or substantially orthogonal to the direction of layering, and a first end surface and a second end surface opposed to each other in a length direction orthogonal or substantially orthogonal to the direction of layering and the width direction; and
    an external electrode provided on the multilayer body;
    wherein
    the external electrode includes a first external electrode provided on the first end surface, a second external electrode provided on the second end surface, and a third external electrode and a fourth external electrode provided on one or both of the first side surface and the second side surface;
    the plurality of layered internal electrode layers are provided on a respective one of the plurality of layered dielectric layers and include a first internal electrode layer connected to the first external electrode, a second internal electrode layer connected to the second external electrode, a third internal electrode layer connected to the third external electrode, and a fourth internal electrode layer connected to the fourth external electrode;

the first internal electrode layer includes a first opposing electrode portion opposed to the second internal electrode layer and a first drawn electrode portion extending to the first end surface;

the second internal electrode layer includes a second opposing electrode portion opposed to the first internal electrode layer and a second drawn electrode portion extending to the second end surface;

the third internal electrode layer is provided at a distance from the first internal electrode layer and located between a vicinity of a tip end of the first opposing electrode portion of the first internal electrode layer and the second drawn electrode portion of the second internal electrode layer adjacent in the direction of layering;

the third internal electrode layer includes a third drawn electrode portion extending to the first side surface and extending in the width direction, a first extension connected to the third drawn electrode portion and extending in the length direction, and a second extension connected to first extension and extending in the width direction; and the fourth internal electrode layer is provided at a distance from the second internal electrode layer and located between a vicinity of a tip end of the second opposing electrode portion of the second internal electrode layer and the first drawn electrode portion of the first internal electrode layer adjacent in the direction of layering.

2. The multilayer ceramic capacitor according to claim 1, wherein
the first internal electrode layer and the third internal electrode layer are located on a same dielectric layer, and the second internal electrode layer and the fourth internal electrode layer are located on a same dielectric layer.

3. The multilayer ceramic capacitor according to claim 1, wherein
the third internal electrode layer is located on a dielectric layer different from a dielectric layer on which the first internal electrode layer is provided and the fourth internal electrode layer is located on a dielectric layer different from a dielectric layer on which the second internal electrode layer is provided.

4. The multilayer ceramic capacitor according to claim 1, wherein
the third internal electrode layer is located on a dielectric layer different from a dielectric layer on which the first internal electrode layer is provided and overlaps with the tip end of the first opposing electrode portion of the first internal electrode layer, and the fourth internal electrode layer is located on a dielectric layer different from a dielectric layer on which the second internal electrode layer is provided and overlaps with the tip end of the second opposing electrode portion of the second internal electrode layer.

5. The multilayer ceramic capacitor according to claim 1, wherein
a potential applied to the first internal electrode layer and the second internal electrode layer and a potential applied to the third internal electrode layer and the fourth internal electrode layer are different from each other.

6. A mount structure for a multilayer ceramic capacitor comprising:
a circuit substrate including on a surface, a first circuit pattern to which a potential is applied, a second circuit pattern that is grounded, and a third circuit pattern and a fourth circuit pattern juxtaposed between the first circuit pattern and the second circuit pattern;
two first resistive elements of a surface mount type and two second resistive elements of a surface mount type; and
the multilayer ceramic capacitor according to claim 1, wherein
one of the first resistive elements is connected between the first circuit pattern and the fourth circuit pattern adjacent to the first circuit pattern and another one of the first resistive elements is connected between the second circuit pattern and the third circuit pattern adjacent to the second circuit pattern;
one of the second resistive elements is connected between the second circuit pattern and the fourth circuit pattern and another one of the second resistive elements is connected between the first circuit pattern and the third circuit pattern;
in the multilayer ceramic capacitor, the first external electrode is connected to the first circuit pattern, the second external electrode is connected to the second circuit pattern, the third external electrode is connected to the third circuit pattern, and the fourth external electrode is connected to the fourth circuit pattern; and
a voltage applied to the first circuit pattern is divided by the first resistive elements and the second resistive elements and the divided voltage is applied to the third circuit pattern and the fourth circuit pattern.

7. The multilayer ceramic capacitor according to claim 1, wherein
the plurality of layered dielectric layers include a first outer layer portion, a plurality of inner dielectric layers, and a second outer layer portion;
the first outer layer portion is located between the first main surface and an internal electrode layer of the plurality of layered internal electrode layers that is closest to the first main surface; and
the second outer layer portion is located between the second main surface and an internal electrode layer of the plurality of layered internal electrode layers that is closest to the second main surface.

8. The multilayer ceramic capacitor according to claim 1, wherein one or more of the plurality of layered dielectric layers includes a dielectric ceramic material.

9. The multilayer ceramic capacitor according to claim 1, wherein an interval between a side of the first extension of the third internal electrode layer on a side of the first side surface and a side of the first extension of the third internal electrode layer at an end on a side of the second side surface is between about 5 μm and about 100 μm.

10. The multilayer ceramic capacitor according to claim 1, wherein the fourth internal electrode layer includes a fourth drawn electrode portion extending to the second side surface and extending in the width direction, a third extension connected to the fourth drawn electrode portion and extending in the length direction, and a fourth extension connected to the third extension and extending in the width direction.

11. The multilayer ceramic capacitor according to claim 10, wherein an interval between a side of the third extension of the fourth internal electrode layer on a side of the first side surface and a side of the third extension of the fourth internal electrode layer at an end on a side of the second side surface is between about 5 μm and about 100 μm.

12. The multilayer ceramic capacitor according to claim 1, wherein the external electrode includes an underlying electrode layer provided on the multilayer body and a plated later that at least partially covers a surface of the underlying electrode layer.

13. The multilayer ceramic capacitor according to claim 12, wherein the underlying electrode layer is a baked layer that includes glass and a metal.

14. The multilayer ceramic capacitor according to claim 12, wherein the underlying electrode layer is a conductive resin layer that includes a thermosetting resin and a metal.

15. The multilayer ceramic capacitor according to claim 12, wherein the underlying electrode layer is a thin layer having a thickness of less than about 1 μm.

16. The multilayer ceramic capacitor according to claim 12, wherein:
the plated later includes an upper plated layer and a lower plated layer;
the upper plated layer includes Sn or Au; and
the lower plated layer includes Ni.

17. A mount structure for a multilayer ceramic capacitor comprising:
a circuit substrate including on a surface, a first circuit pattern to which a potential is applied, a second circuit pattern that is grounded, and a third circuit pattern and a fourth circuit pattern juxtaposed between the first circuit pattern and the second circuit pattern;
two first resistive elements of a surface mount type and two second resistive elements of a surface mount type; and
the multilayer ceramic capacitor; wherein
the multilayer capacitor includes:
a multilayer body including a plurality of layered dielectric layers and a plurality of layered internal electrode layers, the multilayer body including a first main surface and a second main surface opposed to each other in a direction of layering, a first side surface and a second side surface opposed to each other in a width direction orthogonal or substantially orthogonal to the direction of layering, and a first end surface and a second end surface opposed to each other in a length direction orthogonal or substantially orthogonal to the direction of layering and the width direction; and
an external electrode provided on the multilayer body;
the external electrode includes a first external electrode provided on the first end surface, a second external electrode provided on the second end surface, and a third external electrode and a fourth external electrode provided on one or both of the first side surface and the second side surface;
the plurality of layered internal electrode layers are provided on a respective one of the plurality of layered dielectric layers and include a first internal electrode layer connected to the first external electrode, a second internal electrode layer connected to the second external electrode, a third internal electrode layer connected to the third external electrode, and a fourth internal electrode layer connected to the fourth external electrode;
the first internal electrode layer includes a first opposing electrode portion opposed to the second internal electrode layer and a first drawn electrode portion extending to the first end surface;
the second internal electrode layer includes a second opposing electrode portion opposed to the first internal electrode layer and a second drawn electrode portion extending to the second end surface;
the third internal electrode layer is provided at a distance from the first internal electrode layer and located between a vicinity of a tip end of the first opposing electrode portion of the first internal electrode layer and the second drawn electrode portion of the second internal electrode layer adjacent in the direction of layering;
the fourth internal electrode layer is provided at a distance from the second internal electrode layer and located between a vicinity of a tip end of the second opposing electrode portion of the second internal electrode layer and the first drawn electrode portion of the first internal electrode layer adjacent in the direction of layering;
one of the first resistive elements is connected between the first circuit pattern and the fourth circuit pattern adjacent to the first circuit pattern and another one of the first resistive elements is connected between the second circuit pattern and the third circuit pattern adjacent to the second circuit pattern;
one of the second resistive elements is connected between the second circuit pattern and the fourth circuit pattern and another one of the second resistive elements is connected between the first circuit pattern and the third circuit pattern;
in the multilayer ceramic capacitor, the first external electrode is connected to the first circuit pattern, the second external electrode is connected to the second circuit pattern, the third external electrode is connected to the third circuit pattern, and the fourth external electrode is connected to the fourth circuit pattern; and
a voltage applied to the first circuit pattern is divided by the first resistive elements and the second resistive elements and the divided voltage is applied to the third circuit pattern and the fourth circuit pattern.

18. A multilayer ceramic capacitor comprising:
a multilayer body including a plurality of layered dielectric layers and a plurality of layered internal electrode layers, the multilayer body including a first main surface and a second main surface opposed to each other in a direction of layering, a first side surface and a second side surface opposed to each other in a width direction orthogonal or substantially orthogonal to the direction of layering, and a first end surface and a second end surface opposed to each other in a length direction orthogonal or substantially orthogonal to the direction of layering and the width direction; and
an external electrode provided on the multilayer body; wherein
the external electrode includes a first external electrode provided on the first end surface, a second external electrode provided on the second end surface, and a third external electrode and a fourth external electrode provided on one or both of the first side surface and the second side surface;
the plurality of layered internal electrode layers are provided on a respective one of the plurality of layered dielectric layers and include a first internal electrode layer connected to the first external electrode, a second internal electrode layer connected to the second external electrode, a third internal electrode layer connected to the third external electrode, and a fourth internal electrode layer connected to the fourth external electrode;

the first internal electrode layer includes a first opposing electrode portion opposed to the second internal electrode layer and a first drawn electrode portion extending to the first end surface;

the second internal electrode layer includes a second opposing electrode portion opposed to the first internal electrode layer and a second drawn electrode portion extending to the second end surface;

the third internal electrode layer is provided at a distance from the first internal electrode layer and located between a vicinity of a tip end of the first opposing electrode portion of the first internal electrode layer and the second drawn electrode portion of the second internal electrode layer adjacent in the direction of layering;

the fourth internal electrode layer is provided at a distance from the second internal electrode layer and located between a vicinity of a tip end of the second opposing electrode portion of the second internal electrode layer and the first drawn electrode portion of the first internal electrode layer adjacent in the direction of layering; and the fourth internal electrode layer includes a fourth drawn electrode portion extending to the second side surface and extending in the width direction, a third extension connected to the fourth drawn electrode portion and extending in the length direction, and a fourth extension connected to the third extension and extending in the width direction.

* * * * *